United States Patent
Hao et al.

(10) Patent No.: US 11,146,488 B2
(45) Date of Patent: Oct. 12, 2021

(54) DATA PACKET FORWARDING METHOD, DEVICE, AND SYSTEM

(71) Applicant: Huawei Technologies Co., Ltd., Shenzhen (CN)

(72) Inventors: Weiguo Hao, Nanjing (CN); Xinjun Xu, Nanjing (CN); Hao Wu, Nanjing (CN); Fei Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 16/598,506

(22) Filed: Oct. 10, 2019

(65) Prior Publication Data

US 2020/0044969 A1 Feb. 6, 2020

Related U.S. Application Data

(63) Continuation of application No. PCT/CN2018/082435, filed on Apr. 10, 2018.

(30) Foreign Application Priority Data

Apr. 11, 2017 (CN) .......................... 201710233682.4

(51) Int. Cl.
*H04L 12/741* (2013.01)
*H04L 12/46* (2006.01)
(Continued)

(52) U.S. Cl.
CPC ........ *H04L 45/745* (2013.01); *H04L 12/4641* (2013.01); *H04L 41/0668* (2013.01); *H04L 45/28* (2013.01); *H04L 45/38* (2013.01)

(58) Field of Classification Search
CPC .............. H04L 45/745; H04L 12/4641; H04L 41/0668; H04L 45/28; H04L 45/38;
(Continued)

(56) References Cited

U.S. PATENT DOCUMENTS

2002/0099854 A1* 7/2002 Jorgensen ................. H04L 1/20
709/249
2012/0281698 A1* 11/2012 Forster ..................... H04L 45/38
370/392

(Continued)

FOREIGN PATENT DOCUMENTS

CN 102685006 A 9/2012
CN 104320340 A 1/2015
(Continued)

OTHER PUBLICATIONS

Calhoun, P., et al., "Diameter Base Protocol," RFC 3588, Sep. 2003, 147 pages.
(Continued)

*Primary Examiner* — Afshawn M Towfighi
(74) *Attorney, Agent, or Firm* — Conley Rose, P.C.

(57) ABSTRACT

A data packet forwarding method and an apparatus, where the method includes: receiving, by a forwarding device, a first default flow entry of the virtual network from a controller, where the first default flow entry of the virtual network instructs the forwarding device to send a data packet to a specified forwarding device when the forwarding device looks up a first flow table based on a match item of the data packet but no flow entry is hit; receiving, a first data packet from an end system; and when the controller is faulty and the forwarding device looks up the first flow table based on a match item of the first data packet but no flow entry is hit, sending, by the forwarding device, the first data packet to the specified forwarding device using the first default flow entry of the virtual network.

21 Claims, 14 Drawing Sheets

(51) Int. Cl.
*H04L 12/24* (2006.01)
*H04L 12/703* (2013.01)
*H04L 12/721* (2013.01)

(58) Field of Classification Search
CPC ..... H04L 45/64; H04L 12/46; H04L 12/4633; H04L 41/06; H04L 41/0695; H04L 41/145; H04L 45/02; H04L 45/54; H04L 49/252; H04L 45/74
See application file for complete search history.

(56) References Cited

U.S. PATENT DOCUMENTS

| | | |
|---|---|---|
| 2014/0098669 A1 | 4/2014 | Garg et al. |
| 2014/0108632 A1* | 4/2014 | Narasimha .............. H04L 45/38 709/223 |
| 2015/0163151 A1* | 6/2015 | Li .......................... H04L 41/044 370/236 |
| 2018/0241664 A1* | 8/2018 | Singh .................... H04L 63/105 |

FOREIGN PATENT DOCUMENTS

| | | |
|---|---|---|
| CN | 105959217 A | 9/2016 |
| CN | 106101297 A | 11/2016 |
| CN | 106231003 A | 12/2016 |
| CN | 106302265 A | 1/2017 |
| WO | 2015165399 A1 | 11/2015 |

OTHER PUBLICATIONS

Machine Translation and Abstract of Chinese Publication No. CN104320340, Jan. 28, 2015, 21 pages.
Machine Translation and Abstract of Chinese Publication No. CN105959217, Sep. 21, 2016, 35 pages.
Machine Translation and Abstract of Chinese Publication No. CN106302265, Jan. 4, 2017, 20 pages.
"OpenFlow Switch Specification" Version 1.0.0, ( Wire Protocol 0x01 ), Dec. 31, 2009, 42 pages.
Yan Si-yu, et al., "SDN—based MANET Architecture Design and Implementation Based on Extended Open vSwitch," Radio Communications Technology, vol. 42, No. 4, 2016, 6 pages.

* cited by examiner

DATA PACKET FORWARDING METHOD, DEVICE, AND SYSTEM

CROSS-REFERENCE TO RELATED APPLICATIONS

This application is a continuation of International Patent Application No. PCT/CN2018/082435, filed on Apr. 10, 2018, which claims priority to Chinese Patent Application No. 201710233682.4, filed on Apr. 11, 2017. The disclosures of the aforementioned applications are hereby incorporated by reference in their entireties.

TECHNICAL FIELD

Embodiments of the present disclosure relate to the communications field, and in particular, to a data packet forwarding method, a device, and a system.

BACKGROUND

A software defined networking (SDN) architecture based on an idea for separating control and forwarding is a new network switching model, and its key components include a controller and a forwarding device (for example, an OpenFlow switch). A control channel protocol is used for communication between the controller and the forwarding device to exchange messages and transfer information. Currently, frequently used control channel protocols, for example, may include the OpenFlow protocol, the Path Computation Element Communication Protocol, (PCEP), the Border Gateway Protocol (BGP), and the interface to the routing system (I2RS). The controller implements management and control functions using a global view, and generates a forwarding flow table for the forwarding device. The forwarding device forwards a data packet based on the flow table. The flow table includes several flow entries. One flow entry mainly includes parts such as match fields and action instructions. Usually, the controller delivers a flow entry to a corresponding forwarding device based on a requirement in pull mode to save space for storing a flow table by the forwarding device. Specifically, after a forwarding device receives a data packet from another forwarding device, the forwarding device obtains a match item of the data packet (where the match item indicates a target network device for which the data packet is destined), and looks up a flow table using the match item. If no matched flow entry is found in the flow table, the data packet is redirected to the controller. The controller receives and parses the data packet to obtain the match item of the data packet, and generates a corresponding flow entry for the match item based on a network-wide network topology diagram. Then the controller delivers the flow entry to the forwarding device, and resends the data packet to the forwarding device. The forwarding device forwards the data packet to the target network device based on the flow entry.

However, if the controller is faulty, after the forwarding device receives the data packet from another forwarding device, and cannot find a matched flow entry in the flow table, the forwarding device cannot redirect and send the data packet to the faulty controller. The faulty controller cannot generate the flow entry for the match item of the data packet. Therefore, the forwarding device cannot obtain the flow entry, and cannot forward the data packet to the target network device. Consequently, a data flow is interrupted, normal communication cannot be performed, and system reliability is reduced.

SUMMARY

Embodiments of the present disclosure provide a data packet forwarding method, a device, and a system, to resolve a problem that a data flow is interrupted because a forwarding device cannot normally forward a data packet when a controller is faulty in a virtual network working in pull mode in an architecture in which control and forwarding are separated, and help improve system reliability.

To resolve the foregoing problem, a first aspect of the embodiments of the present disclosure provides a data packet forwarding method, applied to a virtual network in which control and forwarding are separated, where the virtual network includes a controller and a forwarding device. In the method, the forwarding device receives a first default flow entry of the virtual network from the controller, where the first default flow entry of the virtual network instructs the forwarding device to send a data packet in the virtual network to a specified forwarding device when the forwarding device looks up a first flow table based on a match item of the data packet in the virtual network but no flow entry is hit; the forwarding device receives a first data packet from an end system (ES) in the virtual network; and when the controller is faulty and the forwarding device looks up the first flow table based on a match item of the first data packet but no flow entry is hit, the forwarding device sends the first data packet to the specified forwarding device using the first default flow entry of the virtual network.

The first default flow entry of the virtual network is added, such that the forwarding device can send the data packet in the virtual network to the specified forwarding device based on the first default flow entry when the controller is faulty and no flow entry is hit when the match item of the received packet is matched in the flow table. Therefore, the forwarding device can normally forward the data packet in the foregoing case, interruption of a data flow is avoided, and system reliability is improved.

In a possible design, the forwarding device receives a second default flow entry of the virtual network from the controller, where the second default flow entry of the virtual network instructs the forwarding device to send a data packet in the virtual network to the controller when the forwarding device looks up the first flow table based on a match item of the data packet in the virtual network but no flow entry is hit, and a priority of the second default flow entry of the virtual network is higher than a priority of the first default flow entry of the virtual network; and when the controller works normally and the forwarding device looks up the first flow table based on the match item of the first data packet but no flow entry is hit, the forwarding device sends the first data packet to the controller using the higher-priority second default flow entry of the virtual network.

Because the first default flow entry of the virtual network and the second default flow entry of the virtual network are set in the same flow table, a highly efficient implementation is provided, and efficiency of matching flow entries is improved. When the controller works normally, the second default flow entry can enable the forwarding device to send the data packet to the controller. Therefore, the flow entry is delivered based on a requirement in pull mode, and storage space of the forwarding device is saved. In addition, because the priorities of the first and second default flow entries are set and adjusted, different match policies can be further used based on different states of the controller, such as normal working, faulty, and fault recovery. Therefore, system flexibility is improved.

In a possible design, when determining that the controller is faulty, the forwarding device sets the priority of the first default flow entry of the virtual network to be higher than the priority of the second default flow entry of the virtual network, such that the first default flow entry of the virtual network is preferentially used to send the first data packet to the specified forwarding device when no flow entry is hit.

In a possible design, when determining that the controller recovers from the fault, the forwarding device sets the priority of the second default flow entry of the virtual network to be higher than the priority of the first default flow entry of the virtual network, such that the second default flow entry of the virtual network is preferentially used to send the first data packet to the controller when no flow entry is hit.

The priority of the first default flow entry of the virtual network is pre-adjusted to be higher than that of the second default flow entry of the virtual network. For example, after it is predetermined that the controller is faulty, the priority of the default flow entry is flexibly adjusted. Therefore, after the packet is received, the higher-priority first default flow entry can be directly matched. There is no need to wait for confirming a status of the controller after the packet is received, and then determining a default flow entry to be used. Therefore, efficiency of packet forwarding can be improved. In addition, after it is known that the status of the controller is updated, for example, after fault recovery, the priority of the second default flow entry is adjusted in time to be higher than the priority of the first default flow entry, and the higher-priority second default flow entry is directly matched. Therefore, efficiency of packet forwarding can be improved, and system reliability and stability are further ensured.

In a possible design, when determining that the controller works normally, the forwarding device sets the priority of the first default flow entry of the virtual network to be higher than the priority of the second default flow entry of the virtual network, such that the first default flow entry of the virtual network is preferentially used to send the first data packet to the specified forwarding device when no flow entry is hit.

When the controller works normally, based on a design requirement or an application scenario, the priority of the first default flow entry may also be flexibly adjusted to be higher than the priority of the second default flow entry, such that the packet can be flexibly sent to the specified forwarding device when no match item is hit. Therefore, flexibility of setting a system based on a requirement is improved.

In a possible design, the forwarding device sets the priority of the first default flow entry of the virtual network to be higher than the priority of the second default flow entry of the virtual network includes: the forwarding device changes the priority of the first default flow entry of the virtual network, such that the priority of the first default flow entry of the virtual network is higher than the priority of the second default flow entry of the virtual network; or the forwarding device changes the priority of the second default flow entry of the virtual network, such that the priority of the second default flow entry is lower than the priority of the first default flow entry of the virtual network.

By adjusting the priority of the first default flow entry of the virtual network to be higher or adjusting the priority of the second default flow entry of the virtual network to be lower, a flexible and simple means of setting priorities is provided to help quickly ensure that the first default flow entry can be selected for forwarding the data packet when the controller is faulty.

In a possible design, the forwarding device receives a second default flow entry of the virtual network from the controller, where the second default flow entry of the virtual network instructs the forwarding device to send a data packet in the virtual network to the controller when the forwarding device looks up a second flow table based on a match item of the data packet in the virtual network but no flow entry is hit; and when the controller works normally and the forwarding device looks up the second flow table based on the match item of the first data packet but no flow entry is hit, the forwarding device sends the first data packet to the controller using the second default flow entry of the virtual network.

Because the second default flow entry of the virtual network is set in a flow table different from the first default flow entry of the virtual network, an implementation that can easily extend a flow table is provided, and system maintainability is improved. When the controller works normally, the second default flow entry can enable the forwarding device to send the data packet to the controller. Therefore, the flow entry is delivered based on a requirement in pull mode, and storage space of the forwarding device is saved.

In a possible design, the forwarding device receives a third default flow entry of the virtual network from the controller, where the third default flow entry of the virtual network instructs the forwarding device to send a data packet in the virtual network based on the first flow table when the forwarding device looks up a third flow table based on a match item of the data packet in the virtual network but no flow entry is hit; and when the controller is faulty and the forwarding device looks up the third flow table based on the match item of the first data packet but no flow entry is hit, the forwarding device sends the first data packet based on the first flow table according to the instruction of the third default flow entry of the virtual network.

Because the third default flow entry of the virtual network is set in a flow table different from the first default flow entry of the virtual network and the second default flow entry of the virtual network, an implementation that can easily extend a flow table is provided, and system maintainability is improved. In addition, using the third default flow entry, when the controller is faulty, the forwarding device may jump to the first default flow entry of the virtual network based on the third default flow entry to forward the data packet normally and avoid interruption of the data flow.

In a possible design, the forwarding device receives a fourth default flow entry of the virtual network from the controller, where the fourth default flow entry of the virtual network instructs the forwarding device to send a data packet in the virtual network based on the second flow table when the forwarding device looks up the third flow table based on a match item of the data packet in the virtual network but no flow entry is hit, and a priority of the fourth default flow entry of the virtual network is higher than a priority of the third default flow entry of the virtual network; and when the controller works normally and the forwarding device looks up the third flow table based on the match item of the first data packet but no flow entry is hit, the forwarding device sends the first data packet based on the second flow table according to the instruction of the higher-priority fourth default flow entry of the virtual network.

Because the fourth default flow entry of the virtual network is set in a flow table same as the third default flow entry of the virtual network but different from the first and second default flow entries of the virtual network, an implementation that can easily extend a flow table is provided, and system maintainability is improved. By flexibly setting the priority of the fourth default flow entry to be higher than the priority of the third default flow entry, when the controller works normally but no flow entry is hit when the match item of the received packet is matched in the flow table, the forwarding device can flexibly jump to the second flow table based on a priority of a corresponding flow entry to further send the packet to the controller. Therefore, the flow entry is delivered based on a requirement, and storage space of the forwarding device is saved. In addition, because the priorities of the third and fourth default flow entries are set and adjusted, different match policies can be further used based on different states of the controller, such as normal working, faulty, and fault recovery. Therefore, system flexibility is improved.

In a possible design, when determining that the controller is faulty, the forwarding device sets the priority of the third default flow entry of the virtual network to be higher than the priority of the fourth default flow entry of the virtual network, such that the first data packet is sent preferentially based on the first flow table according to the instruction of the third default flow entry of the virtual network when no flow entry is hit.

In a possible design, when determining that the controller recovers from the fault, the forwarding device sets the priority of the fourth default flow entry of the virtual network to be higher than the priority of the third default flow entry of the virtual network, such that the first data packet is sent preferentially based on the second flow table according to the instruction of the fourth default flow entry of the virtual network when no flow entry is hit.

The priority of the third default flow entry of the virtual network is pre-adjusted to be higher than that of the fourth default flow entry of the virtual network. For example, after it is pre-confirmed that the controller is faulty, the priority of the default flow entry is flexibly adjusted. Therefore, after the packet is received, the higher-priority third default flow entry is directly matched. There is no need to wait for confirming the status of the controller after the packet is received, and then determining a default flow entry to be used. Therefore, efficiency of packet forwarding can be improved. In addition, after it is known that the status of the controller is updated, for example, after fault recovery, the priority of the fourth default flow entry is adjusted in time to be higher than the priority of the third default flow entry. Therefore, efficiency of packet forwarding can be improved, and system reliability and stability are further ensured.

In a possible design, when determining that the controller works normally, the forwarding device sets the priority of the third default flow entry of the virtual network to be higher than the priority of the fourth default flow entry of the virtual network, such that the first data packet is sent preferentially based on the first flow table according to the instruction of the third default flow entry of the virtual network when no flow entry is hit.

When the controller works normally, based on a design requirement or an application scenario, the priority of the third default flow entry may also be flexibly adjusted to be higher than the priority of the fourth default flow entry, such that the packet can be flexibly sent to the specified forwarding device based on the first default flow entry when no match item is hit. Therefore, flexibility of setting the system based on a requirement is improved.

In a possible design, the setting the priority of the third default flow entry of the virtual network to be higher than the priority of the fourth default flow entry of the virtual network includes: the forwarding device changes the priority of the third default flow entry of the virtual network, such that the priority of the third default flow entry of the virtual network is higher than the priority of the fourth default flow entry of the virtual network; or the forwarding device changes the priority of the fourth default flow entry of the virtual network, such that the priority of the fourth default flow entry is lower than the priority of the third default flow entry of the virtual network.

By adjusting the priority of the third default flow entry of the virtual network to be higher or adjusting the priority of the fourth default flow entry of the virtual network to be lower, a flexible and simple means of setting priorities is provided to help quickly ensure that the third default flow entry can be selected when the controller is faulty. Therefore, the forwarding device can jump to the first default flow entry of the virtual network to forward the data packet, and non-interruption of the data flow is ensured.

In a possible design, the first default flow entry of the virtual network is a flow entry for guiding layer-3 forwarding in a layer-3 virtual network; and sending a data packet in the virtual network to a specified forwarding device includes sending a data packet in the layer-3 virtual network to a forwarding device that stores all or some routing and forwarding information in the layer-3 virtual network.

By setting an action of the first default flow entry of the layer-3 virtual network to sending to the forwarding device that stores all or some routing and forwarding information in the layer-3 virtual network, a method for making data packet forwarding uninterrupted when the controller in the layer-3 virtual network is faulty is provided. Therefore, reliability of forwarding in the layer-3 virtual network is improved.

In a possible design, the first default flow entry of the virtual network is a flow entry for guiding layer-2 forwarding in a layer-2 virtual network; and sending a data packet in the virtual network to a specified forwarding device includes broadcasting a data packet in the layer-2 virtual network to a forwarding device in the layer-2 virtual network.

By setting an action of the first default flow entry of the layer-2 virtual network to broadcast to the forwarding device in the layer-2 virtual network, a method for making data packet forwarding uninterrupted when the controller in the layer-2 virtual network is faulty is provided. Therefore, reliability of forwarding in the layer-2 virtual network is improved.

A second aspect of the embodiments of the present disclosure provides a flow entry sending method, applied to a virtual network in which control and forwarding are separated, where the virtual network includes a controller and a forwarding device. In the method, the controller generates a first default flow entry of the virtual network, where the first default flow entry of the virtual network instructs the forwarding device to send a data packet in the virtual network to a specified forwarding device when the controller is faulty and the forwarding device looks up a flow table based on a match item of the data packet in the virtual network but no flow entry is hit, or instructs the forwarding device to send a data packet in the virtual network to the specified forwarding device when the controller works normally and the forwarding device looks up a flow table based on a match item of the data packet in the virtual network but no flow entry is hit; the controller generates a second default flow entry of the virtual network, where the second default flow entry of the virtual network instructs the forwarding device to send a data packet in the virtual network to the controller when the controller works normally and the forwarding device looks up the flow table based on a match item of the data packet in the virtual network but no flow entry is hit; and the controller sends the first default flow entry of the virtual network and the second default flow entry of the virtual network to the forwarding device.

Because the controller generates and delivers the first and second default flow entries of the virtual network, when the controller works normally or is faulty, the forwarding device can forward a data packet normally. Therefore, interruption of a data flow is avoided, and system reliability is improved.

In a possible design, the first default flow entry of the virtual network is an entry in a first flow table, and instructing the forwarding device when the controller is faulty and the forwarding device looks up the flow table based on a match item of the data packet in the virtual network but no flow entry is hit includes looking up the first flow table but no flow entry is hit; and the second default flow entry of the virtual network is an entry in the first flow table. Further, instructing the forwarding device when the controller works normally and the forwarding device looks up the flow table based on a match item of the data packet in the virtual network but no flow entry is hit includes looking up the first flow table but no flow entry is hit.

Because the first default flow entry of the virtual network and the second default flow entry of the virtual network are set in the same flow table, a highly efficient implementation is provided, and efficiency of matching flow entries is improved. In addition, because the priorities of the first and second default flow entries are set and adjusted, different match policies can be used based on different states of the controller, such as normal working, faulty, and fault recovery. Therefore, system flexibility is improved.

In a possible design, the first default flow entry of the virtual network is an entry in a first flow table, and instructing the forwarding device when the controller is faulty and the forwarding device looks up the flow table based on a match item of the data packet in the virtual network but no flow entry is hit includes looking up the first flow table but no flow entry is hit; and the second default flow entry of the virtual network is an entry in a second flow table, and instructing the forwarding device when the controller works normally and the forwarding device looks up the flow table based on a match item of the data packet in the virtual network but no flow entry is hit includes looking up the second flow table but no flow entry is hit.

Because the first default flow entry of the virtual network and the second default flow entry of the virtual network are set in different flow tables, an implementation that can easily extend a flow table is provided, and system maintainability is improved. In addition, when the controller works normally or is faulty, the forwarding device can normally forward a data packet. Therefore, interruption of the data flow is avoided, and system reliability is improved.

In a possible design, the controller generates a third default flow entry of the virtual network, where the third default flow entry of the virtual network instructs the forwarding device to send a data packet in the virtual network based on the first flow table when the controller is faulty and the forwarding device looks up a third flow table based on a match item of the data packet in the virtual network but no flow entry is hit; and the controller sends the third default flow entry of the virtual network to the forwarding device.

Because the third default flow entry of the virtual network is set in a flow table different from the first default flow entry of the virtual network and the second default flow entry of the virtual network, an implementation that can easily extend a flow table is provided, and system maintainability is improved. Using the third default flow entry, when the controller is faulty, the forwarding device can jump to the first default flow entry of the virtual network based on the third default flow entry to forward the data packet normally and avoid interruption of the data flow.

In a possible design, the controller generates a fourth default flow entry of the virtual network, where the fourth default flow entry of the virtual network instructs the forwarding device to send a data packet in the virtual network based on the second flow table when the controller works normally and the forwarding device looks up the third flow table based on a match item of the data packet in the virtual network but no flow entry is hit; and the controller sends the fourth default flow entry of the virtual network to the forwarding device.

Because the fourth default flow entry of the virtual network is set in a flow table same as the third default flow entry of the virtual network but different from the first and second default flow entries of the virtual network, an implementation that can easily extend a flow table is provided, and system maintainability is improved. Because the priorities of the third and fourth default flow entries are set and adjusted, different match policies can be used based on different states of the controller, such as normal working, faulty, and fault recovery. Therefore, system flexibility is improved.

In a possible design, the first default flow entry of the virtual network is a flow entry for guiding layer-3 forwarding in a layer-3 virtual network; and sending a data packet in the virtual network to a specified forwarding device includes sending a data packet in the layer-3 virtual network to a forwarding device that stores all or some routing and forwarding information in the layer-3 virtual network.

By setting an action of the first default flow entry of the layer-3 virtual network to sending to the forwarding device that stores all or some routing and forwarding information in the layer-3 virtual network, a method for making data packet forwarding uninterrupted when the controller in the layer-3 virtual network is faulty is provided. Therefore, reliability of forwarding in the layer-3 virtual network is improved.

In a possible design, the first default flow entry of the virtual network is an entry for guiding layer-2 forwarding in a layer-2 virtual network; and sending a data packet in the virtual network to a specified forwarding device includes broadcasting a data packet in the layer-2 virtual network to a forwarding device in the layer-2 virtual network.

By setting an action of the first default flow entry of the layer-2 virtual network to broadcasting to the forwarding device in the layer-2 virtual network, a method for making data packet forwarding uninterrupted when the controller in the layer-2 virtual network is faulty is provided. Therefore, reliability of forwarding in the layer-2 virtual network is improved.

According to a third aspect, the present disclosure provides a forwarding device, where the forwarding device is configured to perform the method according to any one of the first aspect or the possible implementations of the first aspect. For example, the forwarding device includes a module configured to perform the method according to any one of the first aspect or the possible implementations of the first aspect.

According to a fourth aspect, the present disclosure provides a forwarding device, where the forwarding device includes a processor, a transceiver, a random access memory, a read-only memory, and a bus. The processor is coupled to a transceiver, the random access memory, and the read-only memory respectively using the bus. When the forwarding device needs to run, a basic input/output system cured in the read-only memory or a bootloader system in an embedded system is used for startup, such that the forwarding device enters a normal running state. After the forwarding device enters the normal running state, an application program and an operating system run in the random access memory, such that the processor performs the method according to any one of the first aspect or the possible implementations of the first aspect.

According to a fifth aspect, a forwarding device is provided, where the forwarding device includes a main control board and an interface board, and may further include a switching board. The forwarding device is configured to perform the method according to any one of the first aspect or the possible implementations of the second aspect. For example, the forwarding device includes a module configured to perform the method according to any one of the first aspect or the possible implementations of the first aspect.

According to a sixth aspect, the present disclosure provides a computer-readable medium, configured to store a computer program, where the computer program includes an instruction used to perform the method according to any one of the first aspect or the possible implementations of the first aspect.

According to a seventh aspect, the present disclosure provides a controller, where the controller is configured to perform the method according to any one of the second aspect or the possible implementations of the second aspect. For example, the controller includes a module configured to perform the method according to any one of the second aspect or the possible implementations of the second aspect.

According to an eighth aspect, the present disclosure provides a controller, where the controller includes a processor, a transceiver, a random access memory, a read-only memory, and a bus. The processor is coupled to a transceiver, the random access memory, and the read-only memory respectively using the bus. When the controller needs to run, a basic input/output system cured in the read-only memory or a bootloader system in an embedded system is used for startup, such that the controller enters a normal running state. After the controller enters the normal running state, an application program and an operating system run in the random access memory, such that the processor performs the method according to any one of the second aspect or the possible implementations of the second aspect.

According to a ninth aspect, the present disclosure provides a computer-readable medium, configured to store a computer program, where the computer program includes an instruction used to perform the method according to any one of the second aspect or the possible implementations of the second aspect.

According to a tenth aspect, a system is provided, where the system includes the forwarding device according to any one of the third aspect to the fifth aspect and the controller according to any one of the seventh aspect to the eighth aspect.

BRIEF DESCRIPTION OF DRAWINGS

To describe the technical solutions in the embodiments of the present disclosure more clearly, the following briefly describes the accompanying drawings required for describing the embodiments or other approaches. The accompanying drawings in the following description merely show some embodiments of the present disclosure, and a person of ordinary skill in the art can derive other implementations of the present disclosure from these accompanying drawings without creative efforts. All of the embodiments or the implementations shall fall within the protection scope of the present disclosure.

FIG. 3A-1 and FIG. 3A-2 are schematic interaction flowcharts of another data packet forwarding method according to an embodiment of the present disclosure;

FIG. 3B-1, FIG. 3B-2, and FIG. 3B-3 are schematic interaction flowcharts of still another data packet forwarding method according to an embodiment of the present disclosure;

DESCRIPTION OF EMBODIMENTS

The following describes the technical solutions in embodiments of the present disclosure clearly with reference to the accompanying drawings. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A network architecture and a service scenario described in the embodiments of the present disclosure are intended to describe the technical solutions in the embodiments of the present disclosure more clearly, and do not constitute a limitation on the technical solutions provided in the embodiments of the present disclosure. A person of ordinary skill in the art may know that with evolution of the network architecture and emergence of new service scenarios, the technical solutions provided in the embodiments of the present disclosure are also applicable to similar technical problems.

A data center (DC) network in a cloud computing era is evolving toward a software defined networking (SDN) architecture based on an idea for separating control and forwarding, and network virtualization. In the DC network based on the SDN architecture, a controller manages and controls forwarding devices in the DC network in a centralized manner, and implements DC network virtualization generally using an overlay network technology. An overlay network is a virtual network over a physical network.

Figure 1:
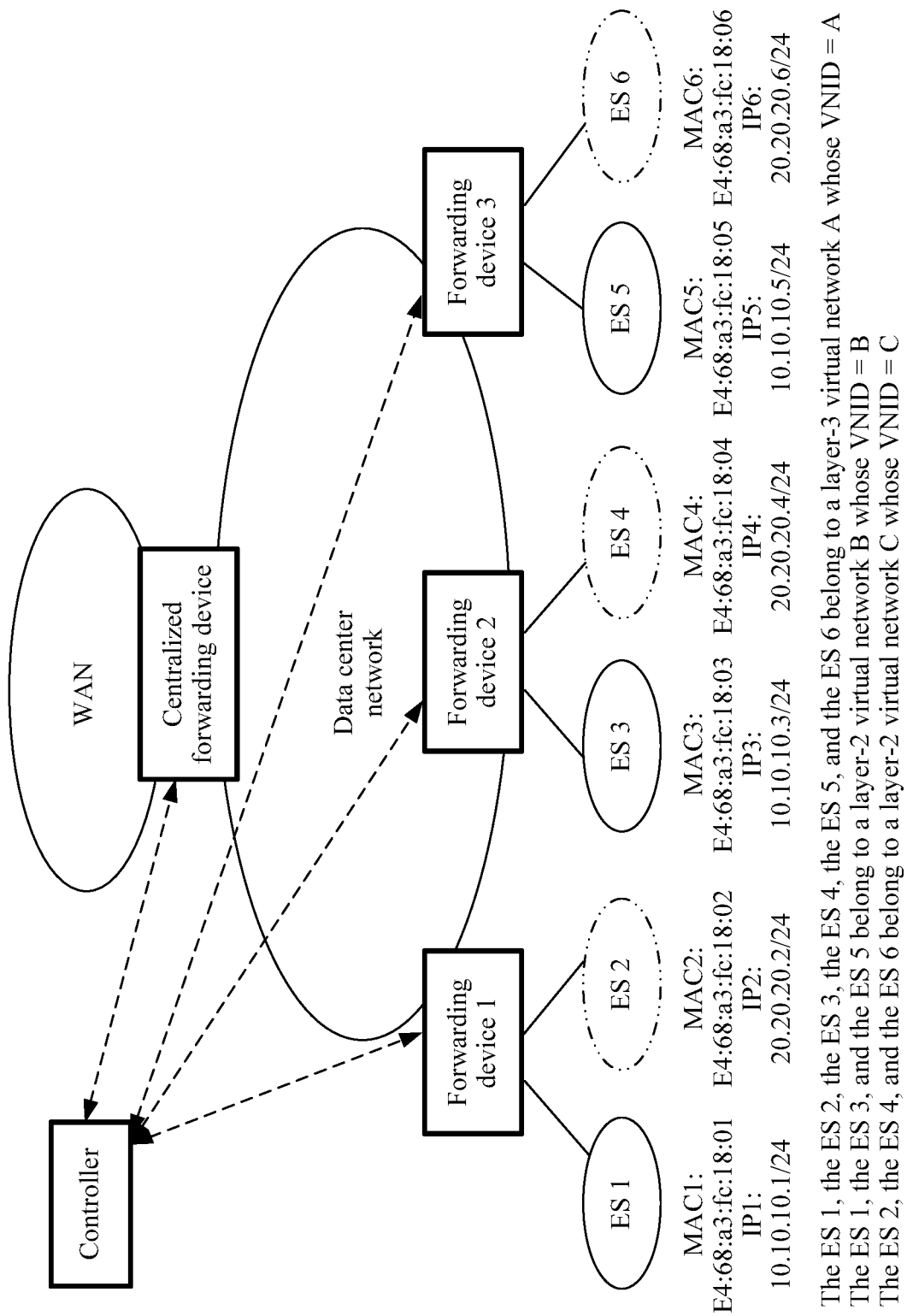
FIG. 1 is a schematic network diagram according to an embodiment of the present disclosure.

As shown in FIG. 1, the DC network based on the SDN architecture uses a centralized controller to control the forwarding devices. Types of terminals accessing the data center network include but are not limited to a virtual machine (VM), a physical host, a physical server, and the like. The terminals are collectively referred to as end systems (ES) in this specification. A forwarding device may be a physical switch or a physical router, or is a virtual switch (vSwitch) or a virtual router (vRouter) based on a software virtualization technology and embedded in a physical server. In FIG. 1, an ES 1 and an ES 2 access the DC network using a forwarding device 1, an ES 3 and an ES 4 access the DC network using a forwarding device 2, and an ES 5 and an ES 6 access the DC network using a forwarding device 3. The ES 1 to the ES 6 access a wide area network (WAN) using a centralized forwarding device, where the WAN is also referred to as an extranet or a public network. The centralized forwarding device is a border forwarding device (or a gateway device) connected to the DC network and the WAN, and has a higher switching capacity and higher forwarding performance than an access forwarding device (such as the forwarding device 1, 2, or 3).

A current mainstream technical framework of data center network virtualization is, for example, network virtualization over layer 3 (NVO3). NVO3 is an overlay network technology over a layer-3 network. NVO3 is based on the Internet Protocol (IP) or multi-protocol label switching (MPLS), and used as a transmission network over which a large-scale layer-2 tenant network is constructed in tunnel connection mode. NVO3 includes a plurality of tunnel encapsulation implementation technologies, for example, a common virtual extensible local area network (VXLAN) and network virtualization over the generic routing encapsulation protocol (NVGRE). A plurality of overlay virtual networks may be defined on a physical network of a data center through virtualization using the NVO3 technology. Each virtual network is a virtual network instance (VNI). An edge node of a virtual network is a network virtualization edge (NVE) node, for example, the forwarding devices 1, 2, and 3, and the centralized forwarding device shown in FIG. 1. A corresponding overlay virtual network creates an overlay tunnel (for example, a VXLAN tunnel or an NVGRE tunnel) connection between NVE nodes. For an original data packet that enters a virtual network, tunnel encapsulation is performed on an NVE node. The encapsulation identifies a forwarding device (that is, an NVE) for decapsulation. Before the encapsulated data packet is sent to a destination ES, the forwarding device for decapsulates the encapsulated data packet to obtain the original data packet. A forwarding device in the middle of the tunnel forwards the encapsulated data packet based on an encapsulated outer packet header, and does not care about an original data frame carried in the data packet. A virtual network identifier (VNID) may be encapsulated in an overlay header (that is, the encapsulated outer packet header), and used to identify the virtual network to which the data frame belongs. Because a virtual data center supports both routing and bridging, the original data packet in an overlay packet header may be an Ethernet frame (that is, a data packet forwarded in a layer-2 virtual network) carrying a media access control (MAC) address, or is only an IP packet (that is, a data packet forwarded in a layer-3 virtual network). It should be noted that, for brevity of description, the layer-2 Ethernet frame and the layer-3 IP packet are collectively referred to as data packets in this application.

A virtual network includes a layer-3 virtual network and a layer-2 virtual network. Each layer-3 virtual network may include one or more layer-2 virtual networks. ESs in each layer-2 virtual network communicate with each other (for example, perform lookup and forwarding based on a layer-2 VNID and a destination MAC address) using a layer-2 flow table (for example, a match item of the flow table includes a MAC address). Each layer-2 virtual network generally corresponds to one subnet. In each layer-3 virtual network, an ES in one subnet performs layer-3 communication with an ES in another subnet (for example, performs lookup and forwarding based on a layer-3 VNID and a destination IP address) using a layer-3 flow table (for example, a match item of the flow table includes an IP address). MAC addresses of ESs in different layer-2 virtual networks may overlap, and IP addresses of ESs in different layer-3 virtual networks may overlap. For the data center using overlay tunnel encapsulation, a layer-2 or layer-3 flow table is located in an edge forwarding device in the network, and a forwarding device in the middle of the network performs only forwarding based on an encapsulated outer tunnel destination IP, and does not have a corresponding forwarding flow table. As shown in FIG. 1, the ES 1, the ES 2, the ES 3, the ES 4, the ES 5, and the ES 6 belong to a same layer-3 virtual network, where the ES 1, the ES 3, and the ES 5 belong to a layer-2 virtual network B, and the ES 2, the ES 4, and the ES 6 belong to a layer-2 virtual network C.

The controller has a topology of an entire network (including the physical network, the layer-2 virtual network, the layer-3 virtual network, and the like). A layer-2 or layer-3 forwarding flow table on a forwarding device is generated by the controller through centralized computation based on the topology, and is delivered in a centralized manner using a control channel protocol. The controller may deliver the layer-2 or layer-3 flow table to the forwarding device in two modes: push and pull. In push mode, regardless of whether the forwarding device requires the flow table, the controller delivers all flow tables to all forwarding devices. For example, in FIG. 1, the controller delivers layer-2 or layer-3 flow entries in each virtual network to all forwarding devices associated with the virtual network. For example, if the forwarding devices 1, 2, and 3 are connected to the layer-3 virtual network A and the layer-2 virtual networks B and C respectively, the controller delivers all layer-3 flow entries of the layer-3 virtual network A and all layer-2 flow entries of the layer-2 virtual networks B and C to the forwarding devices 1, 2, and 3 respectively. In push mode, a large quantity of layer-2 or layer-3 flow entries need to be installed on the forwarding device, there is a very high requirement on flow table space of the forwarding device, and load of a control channel is also increased. Therefore, many controllers deliver flow entries in pull mode.

In pull mode, the controller delivers a flow entry to a corresponding forwarding device based on a requirement. After an ingress forwarding device (the forwarding device 1 shown in FIG. 1) receives a data packet from an access side (the ES 1 shown in FIG. 1), if there is no flow entry corresponding to a destination ES (the ES 3 or the ES 4 shown in FIG. 1), the packet hits a default flow entry, and the packet is redirected to the controller using the default flow entry. The controller parses the data packet to obtain information about an associated egress forwarding device (the forwarding device 2 shown in FIG. 1) based on a destination MAC address (a MAC address of the ES 3 shown in FIG. 1) or an IP address (an IP address of the ES 4 shown in FIG. 1) of the data packet, delivers a corresponding layer-2 or layer-3 flow entry to the ingress forwarding device, and then resends the data packet to the ingress forwarding device. The ingress forwarding device forwards the packet to the egress forwarding device based on the new flow entry, and the egress forwarding device sends the data packet to the destination ES. Generally, the layer-2 or layer-3 flow entry on the ingress forwarding device is periodically aged, and the ingress forwarding device deletes the flow entry after aging. Therefore, the foregoing process is repeated for a subsequently received packet, that is, sending to the controller, delivering a flow entry, installing a flow entry by the forwarding device, and forwarding the packet.

If the controller is faulty, after the ingress forwarding device receives the data packet, if there is no flow entry corresponding to the destination ES, the data packet cannot be redirected to the faulty controller. The faulty controller cannot generate a flow entry for a match item of the data packet. Therefore, the ingress forwarding device cannot obtain the flow entry, and cannot forward the data packet to the destination ES. The forwarding process is interrupted, and layer-2 or layer-3 communication cannot be performed normally between ESs.

The foregoing describes a possible application scenario used in the present disclosure. The following further describes the embodiments of the present disclosure in detail based on this.

Figure 2:
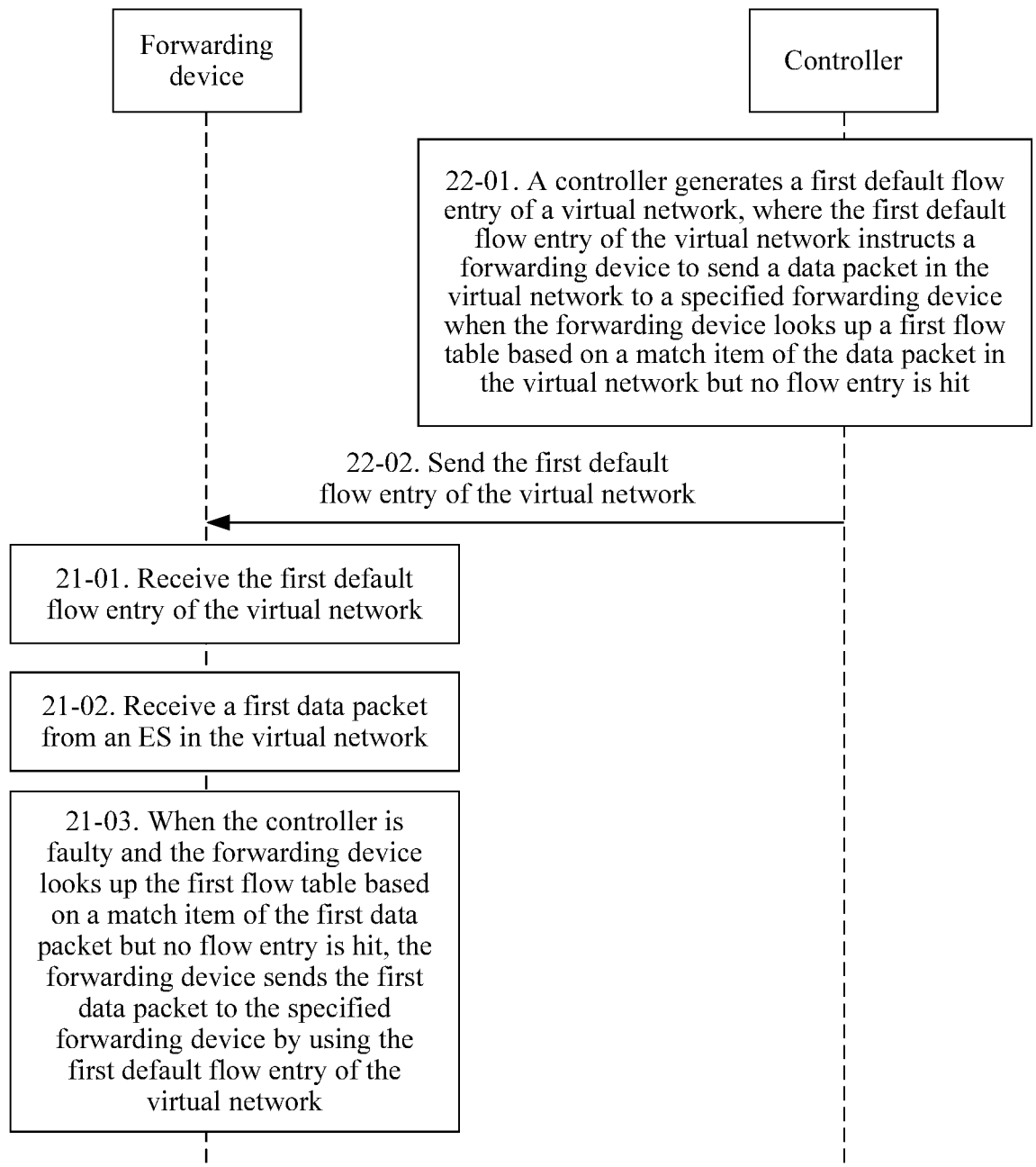
FIG. 2 is a schematic interaction flowchart of a data packet forwarding method according to an embodiment of the present disclosure.

FIG. 2 is a schematic flowchart of a data packet forwarding method according to an embodiment of the present disclosure. The method may be applied to the application scenario shown in FIG. 1.

The solution provided in this embodiment of the present disclosure includes step 22-01, step 22-02, step 21-01, step 21-02, and step 21-03, where step 22-01 and step 22-02 are performed on a controller, and step 21-01, step 21-02, and step 21-03 are performed on a forwarding device. The following provides detailed descriptions separately.

Part 22-01: The controller generates a first default flow entry of a virtual network, where the first default flow entry of the virtual network instructs the forwarding device to send a data packet in the virtual network to a specified forwarding device when the forwarding device looks up a first flow table based on a match item of the data packet in the virtual network but no flow entry is hit. When the controller is faulty, the first default flow entry of the virtual network is used by the forwarding device to forward the data packet in the virtual network.

Optionally, when the controller works normally, the first default flow entry of the virtual network may also be used by the forwarding device to forward the data packet in the virtual network.

Part 22-02: The controller sends the first default flow entry of the virtual network to the forwarding device.

Because the controller generates and delivers the first default flow entry of the virtual network, when the controller is faulty, the forwarding device can forward a data packet normally. Therefore, interruption of a data flow is avoided, and system reliability is improved.

Optionally, the controller further generates a second default flow entry of the virtual network, and sends the second default flow entry to the forwarding device, where the second default flow entry of the virtual network instructs the forwarding device to send a data packet in the virtual network to the controller when the forwarding device looks up a flow table based on a match item of the data packet in the virtual network but no flow entry is hit. When the controller works normally (which may include that the controller works normally after initial startup and that the controller works normally after fault recovery), the second default flow entry of the virtual network is used by the forwarding device to forward the data packet in the virtual network. The second default flow entry of the virtual network may be an entry in the first flow table (that is, that the forwarding device looks up a flow table based on a match item of the data packet in the virtual network but no flow entry is hit includes looking up the first flow table), or may be an entry in a second flow table (that is, that the forwarding device looks up a flow table based on a match item of the data packet in the virtual network but no flow entry is hit includes looking up the second flow table).

When the second default flow entry of the virtual network is an entry in the first flow table, the first default flow entry of the virtual network and the second default flow entry of the virtual network are two different flow entries in the same flow table. Based on a normal or faulty state of the controller, the two default flow entries are respectively selected for forwarding a data packet. For a method for using a default entry in this case, refer to the following descriptions about the FIG. 3A-1 and FIG. 3A-2.

Optionally, when the controller is faulty, a priority of the first default flow entry is set and adjusted to be higher than a priority of the second default flow entry, such that when no entry is hit during table lookup, the first default flow entry of the virtual network can be preferentially selected for sending a data packet to the specified forwarding device. Alternatively, when the controller works normally, based on a specific requirement of a user, a priority of the first default flow entry may be set and adjusted to be higher than a priority of the second default flow entry, such that when no entry is hit during table lookup, the first default flow entry of the virtual network may be preferentially selected for sending a data packet to the specified forwarding device. When the controller is faulty after initial startup or a period of work and then recovers and works normally, the priority of the second default flow entry is set and adjusted to be higher than the priority of the first default flow entry, such that when no entry is hit during table lookup, the second default flow entry of the virtual network may be preferentially selected for sending a data packet to the controller.

Because the first default flow entry of the virtual network and the second default flow entry of the virtual network are set in the same flow table, a highly efficient implementation is provided, and efficiency of matching flow entries is improved. When the controller works normally, the second default flow entry can enable the forwarding device to send the data packet to the controller. Therefore, the flow entry is delivered based on a requirement in pull mode, and storage space of the forwarding device is saved. Because the priorities of the first and second default flow entries are set and adjusted, different match policies can be used based on different states of the controller, such as normal working, faulty, and fault recovery. Therefore, system flexibility is improved.

When the second default flow entry of the virtual network is an entry in the second flow table, the first default flow entry of the virtual network and the second default flow entry of the virtual network are flow entries in two different flow tables.

Because the first default flow entry of the virtual network and the second default flow entry of the virtual network are set in different flow tables, an implementation that can easily extend a flow table is provided, and system maintainability is improved. When the controller works normally, the second default flow entry can enable the forwarding device to send the data packet to the controller. Therefore, the flow entry is delivered based on a requirement in pull mode, and storage space of the forwarding device is saved.

In this case, optionally, the controller further generates a third default flow entry of the virtual network, and sends the third default flow entry to the forwarding device, where the third default flow entry of the virtual network instructs the forwarding device to send a data packet in the virtual network based on the first flow table when the forwarding device looks up a third flow table based on a match item of the data packet in the virtual network but no flow entry is hit. When the controller is faulty, the third default flow entry of the virtual network is used by the forwarding device to forward the data packet in the virtual network.

Because the third default flow entry of the virtual network is set in a flow table different from the first default flow entry of the virtual network and the second default flow entry of the virtual network, an implementation that can easily extend a flow table is provided, and system maintainability is improved. Using the third default flow entry, when the controller is faulty, the forwarding device can jump to the first default flow entry of the virtual network based on the third default flow entry to forward the data packet normally and avoid interruption of the data flow.

Further, optionally, the controller further generates a fourth default flow entry of the virtual network, and sends the fourth default flow entry to the forwarding device, where the fourth default flow entry of the virtual network instructs the forwarding device to send a data packet in the virtual network based on the second flow table when the forwarding device looks up the third flow table based on a match item of the data packet in the virtual network but no flow entry is hit. When the controller works normally, the fourth default flow entry of the virtual network is used by the forwarding device to forward the data packet in the virtual network.

Optionally, based on the normal or faulty state of the controller and a requirement of the user, priorities of the third and fourth default flow entries are flexibly set, to control selection of the four default flow entries respectively for forwarding data packets. For example, when the controller is faulty, a priority of the third default flow entry is set and adjusted to be higher than a priority of the fourth default flow entry, such that when no entry is hit during table lookup, the third and first default flow entries can be preferentially selected for sending a data packet to the specified forwarding device. Alternatively, when the controller works normally, based on a specific requirement of the user, a priority of the third default flow entry may be set and adjusted to be higher than a priority of the fourth default flow entry, such that when no entry is hit during table lookup, the third and first default flow entries can be preferentially selected for sending a data packet to the specified forwarding device. When the controller is faulty after initial startup or a period of work and then recovers and works normally, the priority of the fourth default flow entry is set and adjusted to be higher than the priority of the third default flow entry, such that when no entry is hit during table lookup, the fourth and second default flow entries can be preferentially selected for sending a data packet to the controller. For a method for using a default entry in this case, refer to the following descriptions about the FIG. 3B-1, FIG. 3B-2, and FIG. 3B-3.

Because the fourth default flow entry of the virtual network is set in a same flow table as the third default flow entry of the virtual network, an implementation that can easily maintain and extend a flow table is provided. Because the priorities of the third and fourth default flow entries are set and adjusted, different match policies can be used based on different states of the controller, such as normal working, faulty, and fault recovery. Therefore, system flexibility is improved.

Optionally, the first default flow entry of the virtual network is an entry for guiding layer-3 forwarding in a layer-3 virtual network. Sending a data packet in the virtual network to a specified forwarding device includes sending a data packet in the layer-3 virtual network to a forwarding device that stores all or some routing and forwarding information in the layer-3 virtual network. Correspondingly, the second, third, or fourth default flow entry of the virtual network is also an entry for guiding layer-3 forwarding in the layer-3 virtual network.

By setting an action of the first default flow entry of the layer-3 virtual network to sending to the forwarding device that stores all or some routing and forwarding information in the layer-3 virtual network, a method for making data packet forwarding uninterrupted when the controller in the layer-3 virtual network is faulty is provided. Therefore, reliability of forwarding in the layer-3 virtual network is improved.

Optionally, the first default flow entry of the virtual network is an entry for guiding layer-2 forwarding in a layer-2 virtual network. Sending a data packet in the virtual network to a specified forwarding device includes broadcasting a data packet in the layer-2 virtual network to a forwarding device in the layer-2 virtual network. Correspondingly, the second, third, or fourth default flow entry of the virtual network is also an entry for guiding layer-2 forwarding in the layer-2 virtual network.

By setting an action of the first default flow entry of the layer-2 virtual network to broadcasting to the forwarding device in the layer-2 virtual network, a method for making data packet forwarding uninterrupted when the controller in the layer-2 virtual network is faulty is provided. Therefore, reliability of forwarding in the layer-2 virtual network is improved.

Part 21-01: The forwarding device receives the first default flow entry of the virtual network from the controller, and stores the flow entry in the first flow table.

Optionally, the forwarding device further receives the second default flow entry of the virtual network from the controller, where the second default flow entry of the virtual network may be stored in the first flow table, and is an entry in the first flow table; or the second default flow entry of the virtual network may be stored in the second flow table, and is an entry in the second flow table. Definitions and descriptions of the second default flow entry of the virtual network are consistent with the descriptions in parts 22-01 and 22-02 on a controller side. Details are not described again herein.

When both the second default flow entry of the virtual network and the first default flow entry of the virtual network are entries in the first flow table, the priority of the second default flow entry of the virtual network is higher than the priority of the first default flow entry of the virtual network. For a method for using a default entry in this case, refer to the following descriptions about the FIG. 3A-1 and FIG. 3A-2.

Because the first default flow entry of the virtual network and the second default flow entry of the virtual network are set in the same flow table, a highly efficient implementation is provided, and efficiency of matching flow entries is improved. When the controller works normally, the second default flow entry can enable the forwarding device to send the data packet to the controller. Therefore, the flow entry is delivered based on a requirement in pull mode, and storage space of the forwarding device is saved. In addition, because the priorities of the first and second default flow entries are set and adjusted, different match policies can be further used based on different states of the controller, such as normal working, faulty, and fault recovery. Therefore, system flexibility is improved (for details, refer to descriptions in manner 1 of the following part 21-03).

When the first default flow entry of the virtual network and the second default flow entry of the virtual network are flow entries in two different flow tables, the forwarding device further receives the third and fourth flow entries of the virtual network from the controller, and stores the third and fourth default flow entries of the virtual network in the third flow table. The priority of the fourth default flow entry of the virtual network is higher than the priority of the third default flow entry of the virtual network. Definitions and descriptions of the third and fourth default flow entries of the virtual network are consistent with the descriptions in parts 22-01 and 22-02 on the controller side. Details are not described again herein. For a method for using a default entry in this case, refer to the following descriptions about the FIG. 3B-1, FIG. 3B-2, and FIG. 3B-3.

Because the fourth default flow entry of the virtual network is set in a flow table same as the third default flow entry of the virtual network but different from the first and second default flow entries of the virtual network, an implementation that can easily extend a flow table is provided, and system maintainability is improved. By flexibly setting the priority of the fourth default flow entry to be higher than the priority of the third default flow entry, when the controller works normally but no flow entry is hit when the match item of the received packet is matched in the flow table, the forwarding device can flexibly jump to the second default flow entry based on a priority of a corresponding flow entry to further send the packet to the controller. Therefore, the flow entry is delivered based on a requirement, and storage space of the forwarding device is saved. In addition, because the priorities of the third and fourth default flow entries are set and adjusted, different match policies can be further used based on different states of the controller, such as normal working, faulty, and fault recovery. Therefore, system flexibility is improved (for details, refer to descriptions in manner 2 of the following part 21-03).

Part 21-02: The forwarding device receives a first data packet from an end system (ES) in the virtual network.

Part 21-03: When the controller is faulty and the forwarding device looks up the first flow table based on a match item of the first data packet but no flow entry is hit, the forwarding device sends the first data packet to the specified forwarding device using the first default flow entry of the virtual network.

Optionally, when the forwarding device detects that the controller is faulty (for example, the forwarding device can perceive, using a protocol such as OpenFlow, that a protocol connection to the controller is disconnected), the forwarding device may preferentially select the first default flow entry by setting the priority of the default flow entry to forward the data packet. For example, the following describes two manners separately.

Manner 1: When both the second default flow entry of the virtual network and the first default flow entry of the virtual network are entries in the first flow table, when the forwarding device determines that the controller is faulty, the forwarding device flexibly sets the priority of the first default flow entry of the virtual network to be higher than the priority of the second default flow entry of the virtual network, such that the first default flow entry of the virtual network is preferentially used to send the first data packet to the specified forwarding device. In addition, when determining that the controller recovers from the fault, the forwarding device may further set the priority of the second default flow entry of the virtual network to be higher than the priority of the first default flow entry of the virtual network, such that the second default flow entry of the virtual network is preferentially used to send the first data packet to the controller when no flow entry is hit. For a method for using a default entry in this case, refer to the following descriptions about the FIG. 3A-1 and FIG. 3A-2.

The priority of the first default flow entry of the virtual network is pre-adjusted to be higher than that of the second default flow entry of the virtual network. For example, after it is pre-confirmed that the controller is faulty, the priority of the default flow entry is flexibly adjusted. Therefore, after the packet is received, the higher-priority first default flow entry can be directly matched. There is no need to wait for confirming a status of the controller after the packet is received, and then determining a default flow entry to be used. Therefore, efficiency of packet forwarding can be improved. In addition, after it is known that the status of the controller is updated, for example, after fault recovery, the priority of the second default flow entry is adjusted in time to be higher than the priority of the first default flow entry, and the higher-priority second default flow entry is directly matched. Therefore, efficiency of packet forwarding can be improved, and system reliability and stability are further ensured. It may be understood that, from a perspective of knowing the status of the controller in real time, alternatively, after the packet is received, the status of the controller may be queried, and after it is confirmed that the controller is faulty, the first default flow entry is used as a basis for packet forwarding.

Optionally, when determining that the controller works normally, the forwarding device may also flexibly set, based on a design requirement or an application scenario, the priority of the first default flow entry of the virtual network to be higher than the priority of the second default flow entry of the virtual network, such that the first default flow entry of the virtual network is preferentially used to send the first data packet to the specified forwarding device when no flow entry is hit. Therefore, flexibility of setting a system based on a requirement is improved.

Optionally, the forwarding device changes the priority of the first default flow entry of the virtual network, such that the priority of the first default flow entry of the virtual network is higher than the priority of the second default flow entry of the virtual network. Alternatively, the forwarding device changes the priority of the second default flow entry of the virtual network, such that the priority of the second default flow entry is lower than the priority of the first default flow entry of the virtual network.

By adjusting the priority of the first default flow entry of the virtual network to be higher or adjusting the priority of the second default flow entry of the virtual network to be lower, a flexible and simple means of setting priorities is provided to help quickly ensure that the first default flow entry can be selected for forwarding the data packet when the controller is faulty.

Manner 2: When the first default flow entry of the virtual network and the second default flow entry of the virtual network are flow entries in two different flow tables, when the forwarding device determines that the controller is faulty, the forwarding device flexibly sets the priority of the third default flow entry of the virtual network to be higher than the priority of the fourth default flow entry of the virtual network, such that the third default flow entry of the virtual network is preferentially used to send the first data packet to the first flow table. In addition, when determining that the controller recovers from the fault, the forwarding device may further flexibly set the priority of the fourth default flow entry of the virtual network to be higher than the priority of the third default flow entry of the virtual network, such that the first data packet is sent preferentially based on the second flow table according to the instruction of the fourth default flow entry of the virtual network when no flow entry is hit. For a method for using a default entry in this manner, refer to the following descriptions about the FIG. 3B-1, FIG. 3B-2, and FIG. 3B-3.

The priority of the third default flow entry of the virtual network is pre-adjusted to be higher than that of the fourth default flow entry of the virtual network. For example, after it is pre-confirmed that the controller is faulty, the priority of the default flow entry is flexibly adjusted. Therefore, after the packet is received, the higher-priority third default flow entry is directly matched. There is no need to wait for confirming the status of the controller after the packet is received, and then determining a default flow entry to be used. Therefore, efficiency of packet forwarding can be improved. In addition, after it is known that the status of the controller is updated, for example, after fault recovery, the priority of the fourth default flow entry is adjusted in time to be higher than the priority of the third default flow entry. Therefore, efficiency of packet forwarding can be improved, and system reliability and stability are further ensured. It may be understood that, from the perspective of knowing the status of the controller in real time, alternatively, after the packet is received, the status of the controller may be queried, and after it is confirmed that the controller is faulty, the third default flow entry is used as a basis for packet forwarding.

When determining that the controller works normally, the forwarding device may also flexibly set, based on a design requirement or an application scenario, the priority of the third default flow entry of the virtual network to be higher than the priority of the fourth default flow entry of the virtual network, such that the first data packet is sent preferentially based on the first flow table according to the instruction of the third default flow entry of the virtual network when no flow entry is hit. Therefore, flexibility of setting the system based on a requirement is improved.

Optionally, the forwarding device changes the priority of the third default flow entry of the virtual network, such that the priority of the third default flow entry of the virtual network is higher than the priority of the fourth default flow entry of the virtual network. Alternatively, the forwarding device changes the priority of the fourth default flow entry of the virtual network, such that the priority of the fourth default flow entry is lower than the priority of the third default flow entry of the virtual network.

By adjusting the priority of the third default flow entry of the virtual network to be higher or adjusting the priority of the fourth default flow entry of the virtual network to be lower, a flexible and simple means of setting priorities is provided to help quickly ensure that the third default flow entry can be selected when the controller is faulty. Therefore, the forwarding device can jump to the first default flow entry of the virtual network to forward the data packet, and non-interruption of the data flow is ensured.

Optionally, the first default flow entry of the virtual network is an entry for guiding layer-3 forwarding in the layer-3 virtual network or an entry for guiding layer-2 forwarding in the layer-2 virtual network. Detailed descriptions are consistent with the descriptions in parts 22-01 and 22-02 on the controller side. Details are not described again herein.

Figures 1, 3A:
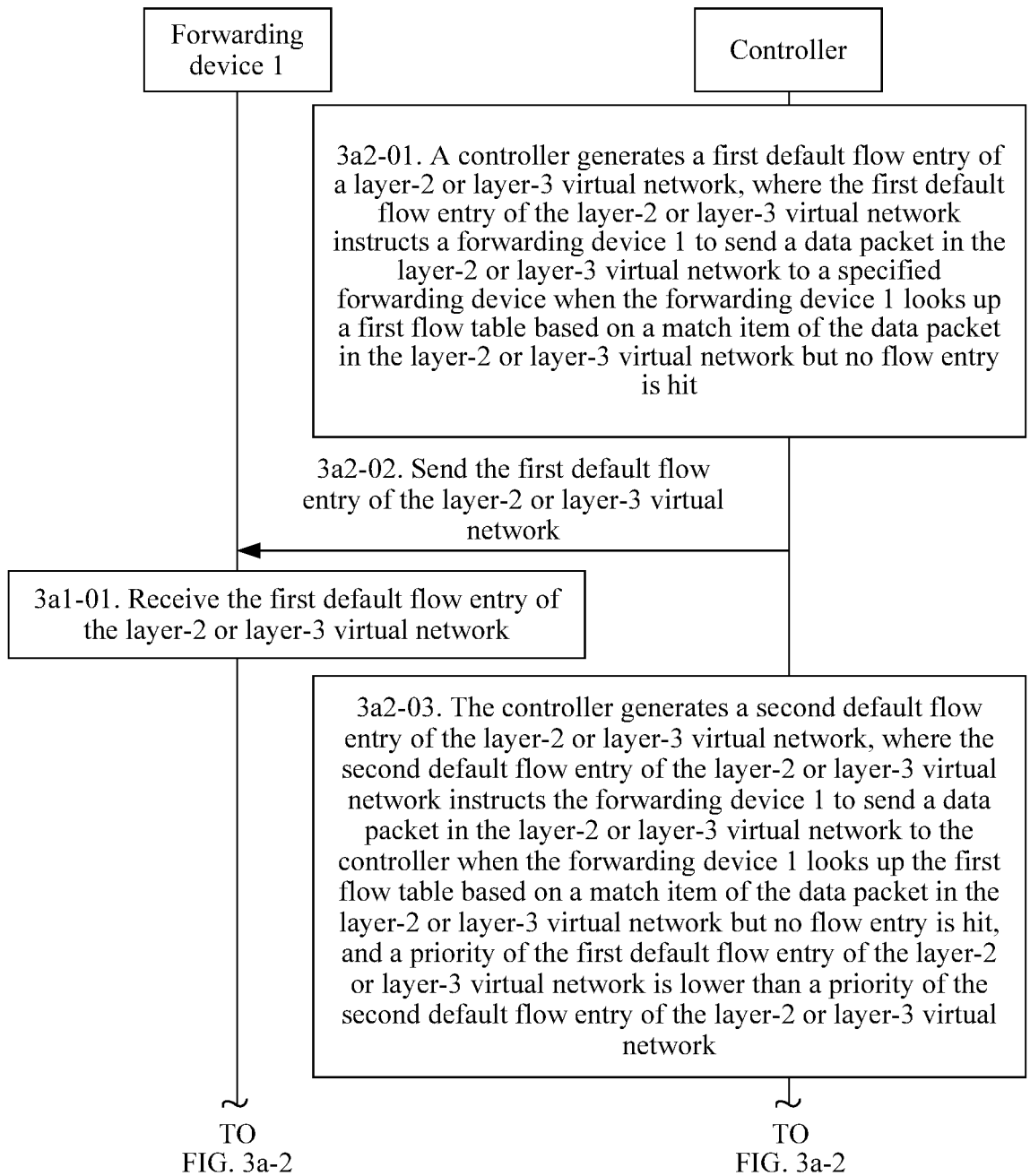
Figures 2, 3A:
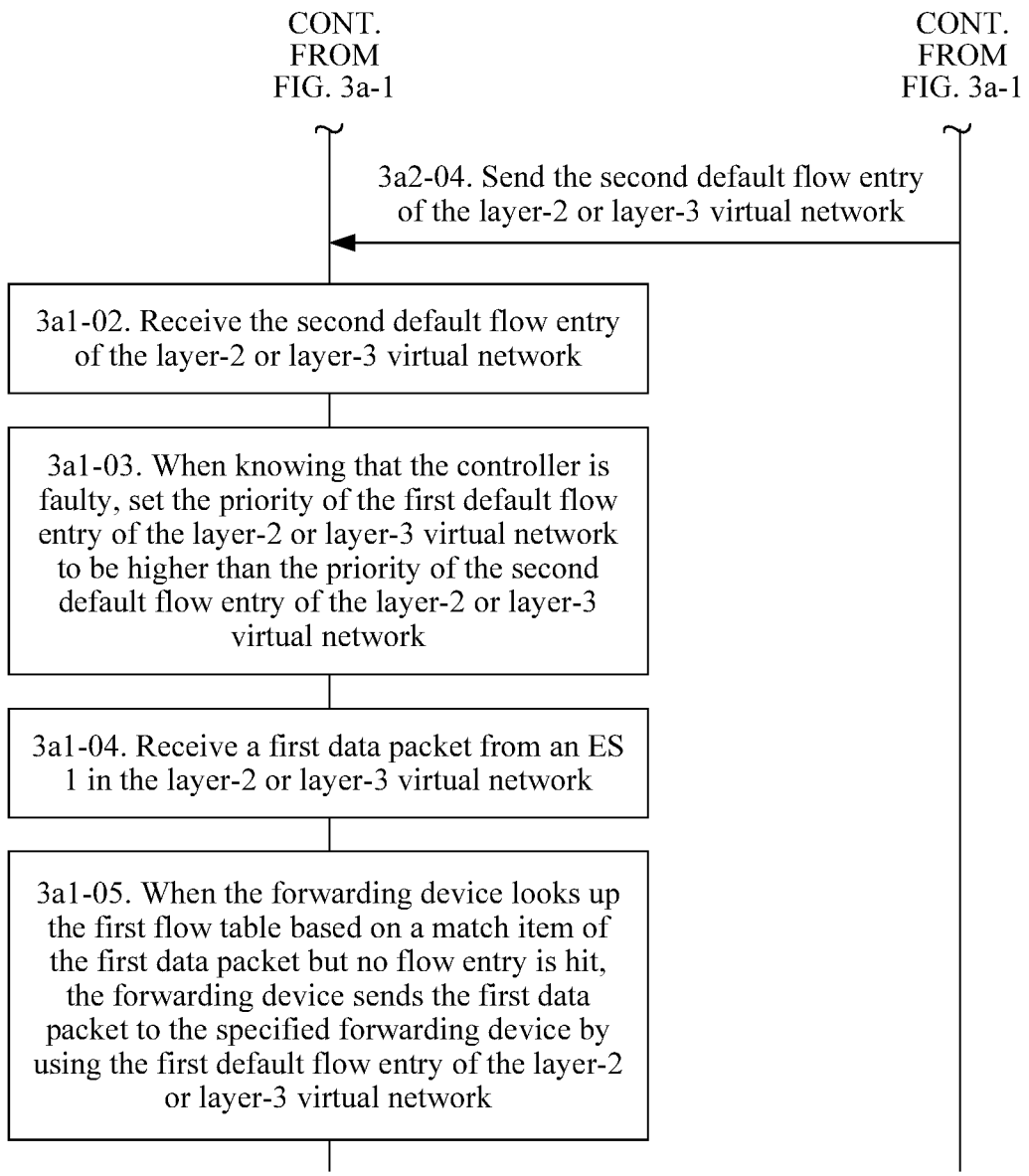

FIG. 3A-1 and FIG. 3A-2 are schematic interaction flowcharts of a method when default flow entries are in a same flow table (a refined example of related parts of the method embodiment in FIG. 2). The following describes the method embodiment of the present disclosure with reference to the scenario in FIG. 1. As shown in FIG. 1, the controller creates a layer-2 and/or layer-3 virtual network for ESs connected to the forwarding devices 1, 2, and 3. The ES 1, the ES 2, the ES 3, the ES 4, the ES 5, and the ES 6 belong to the same layer-3 virtual network A (whose VNID=A), where the ES 1, the ES 3, and the ES 5 belong to the layer-2 virtual network B (whose VNID=B), and the ES 2, the ES 4 and the ES 6 belong to the layer-2 virtual network C (whose VNID=C). A MAC address of the ES 1 is MAC1, for example, E4:68:a3:fc:18:01. An IP address of the ES 1 is IP1, for example, 10.10.10.1/24. MAC addresses and IP addresses of other ESs are shown in FIG. 1. Details are not described. The forwarding device 1 is connected to the ES 1 that belongs to the layer-2 virtual network B, the ES 2 that belongs to the layer-2 virtual network C, and the ES 1and the ES 2 that belong to the layer-3 virtual network A.

The following describes a process of interaction between the controller and the forwarding device 1 using an example in which the forwarding device 1 is in the layer-2 virtual network B and the layer-3 virtual network A respectively.

When the controller works in pull mode, after the layer-2 and/or layer-3 virtual network are/is created successfully, the following steps are performed on the controller.

3a2-01. Generate a first default flow entry of the layer-2 or layer-3 virtual network for the forwarding device 1, where the first default flow entry of the layer-2 or layer-3 virtual network instructs the forwarding device 1 to send a data packet in the layer-2 or layer-3 virtual network to a specified forwarding device when the forwarding device 1 looks up a first flow table based on a match item of the data packet in the layer-2 or layer-3 virtual network but no flow entry is hit.

In the example of the layer-2 virtual network, if the layer-2 virtual network is the layer-2 virtual network B including the ES 1, the ES 3, and the ES 5, the first default flow entry (as shown in Table 1) of the layer-2 virtual network B of the forwarding device 1 instructs the forwarding device 1 to broadcast a data packet in the layer-2 virtual network B to a forwarding device in the layer-2 virtual network B when the forwarding device 1 looks up the first flow table based on a match item of the data packet in the layer-2 virtual network B but no flow entry is hit, that is, send the data packet to the forwarding device 2 connected to the ES 3 and the forwarding device 3 connected to the ES 5.

TABLE 1

| Flow table ID | Match item | Priority | Action |
| --- | --- | --- | --- |
| 1 | VNID = B | Low | Broadcast the data packet to the forwarding device in the layer-2 virtual network B |

In the example of the layer-3 virtual network, if the layer-3 virtual network is the layer-3 virtual network A including the ES 1, the ES 2, the ES 3, the ES 4, the ES 5, and the ES 6, the first default flow entry (as shown in Table 2) of the layer-3 virtual network A of the forwarding device 1 instructs the forwarding device 1 to send a data packet in the layer-3 virtual network A when the forwarding device 1 looks up the first flow table based on a match item of the data packet in the layer-3 virtual network A but no flow entry is hit, to a forwarding device that stores all or some routing and forwarding information in the layer-3 virtual network, that is, send the data packet to the centralized forwarding device. For example, the BGP routing protocol based on an Ethernet virtual private network (EVPN) runs between the centralized forwarding device and other forwarding devices 1, 2, and 3. Therefore, the centralized forwarding device can obtain routing and forwarding information of the entire layer-3 network. If the forwarding device 1, the forwarding device 2, and/or the forwarding device 3 are/is a virtual forwarding device, and have/has only a forwarding function, but do/does not have a control plane function, and the control plane function is completed by an independent controller, the BGP routing protocol runs between the centralized forwarding device and the controller to collect routing and forwarding information of the forwarding device 1, the forwarding device 2, and/or the forwarding device 3.

TABLE 2

| Flow table ID | Match item | Priority | Action |
|---|---|---|---|
| 1 | VNID = A | Low | Send the data packet in the layer-3 virtual network to the forwarding device that stores all or some routing and forwarding information in the layer-3 virtual network |

It should be noted that, the first default flow entry of the virtual network may also be understood as a flow entry whose match item is a VNID or a flow entry whose match item is a VNID and a wildcard. When the VNID and another match item (such as an IP address or a MAC address) are combined for looking up a flow table but no flow entry can be accurately hit, the flow entry whose match item is the VNID is selected or hit. The flow entry may be understood as a default flow entry identified by the VNID in the virtual network. When the data packet in the virtual network cannot accurately hit a flow entry during flow table lookup, the default flow entry of the virtual network is selected for forwarding.

3*a*2-02. Send the first default flow entry of the layer-2 or layer-3 virtual network.

In the example of the layer-2 virtual network, the controller sends the first default flow entry of the layer-2 virtual network B, generated for the forwarding device 1 in the foregoing step 3*a*2-01, to the forwarding device 1.

In the example of the layer-3 virtual network, the controller sends the first default flow entry of the layer-3 virtual network A, generated for the forwarding device 1 in the foregoing step 3*a*2-01, to the forwarding device 1.

3*a*2-03. The controller generates a second default flow entry of the layer-2 or layer-3 virtual network for the forwarding device 1, where the second default flow entry of the layer-2 or layer-3 virtual network instructs the forwarding device to send a data packet in the layer-2 or layer-3 virtual network to the controller when the forwarding device looks up the first flow table based on a match item of the data packet in the layer-2 or layer-3 virtual network but no flow entry is hit, and a priority of the first default flow entry of the layer-2 or layer-3 virtual network is lower than a priority of the second default flow entry of the layer-2 or layer-3 virtual network.

In the example of the layer-2 virtual network B, the second default flow entry (as shown in Table 3) of the layer-2 virtual network B of the forwarding device 1 instructs the forwarding device 1 to send the data packet in the layer-2 virtual network to the controller when the forwarding device 1 looks up the first flow table based on the match item of the data packet in the layer-2 virtual network B but no flow entry is hit.

TABLE 3

| Flow table ID | Match item | Priority | Action |
|---|---|---|---|
| 1 | VNID = B | High | Send the data packet to the controller |

Likewise, in the example of the layer-3 virtual network, the second default flow entry (as shown in Table 4) of the layer-3 virtual network A of the forwarding device 1 instructs the forwarding device 1 to send the data packet in the layer-3 virtual network to the controller when the forwarding device 1 looks up the first flow table based on the match item of the data packet in the layer-3 virtual network but no flow entry is hit.

TABLE 4

| Flow table ID | Match item | Priority | Action |
|---|---|---|---|
| 1 | VNID = A | High | Send the data packet to the controller |

3*a*2-04. Send the second default flow entry of the layer-2 or layer-3 virtual network.

In the example of the layer-2 virtual network, the controller sends the second default flow entry of the layer-2 virtual network B, generated for the forwarding device 1 in the foregoing step 3*a*2-03, to the forwarding device 1.

In the example of the layer-3 virtual network, the controller sends the second default flow entry of the layer-3 virtual network A, generated for the forwarding device 1 in the foregoing step 3*a*2-03, to the forwarding device 1.

It should be noted that, a sequence of generating the first default flow entry and the second default flow entry of the layer-2 or layer-3 virtual network by the controller is not limited. The first default flow entry may be generated first, or the second default flow entry may be generated first. A sequence of delivering the first default flow entry and the second default flow entry to the forwarding device 1 by the controller is not limited either. The first default flow entry may be delivered first, or the second default flow entry may be delivered first, or the first default flow entry and the second default flow entry may be placed in one message and delivered together to the forwarding device 1.

The following steps are performed on the forwarding device 1.

3*a*1-01. Receive the first default flow entry of the layer-2 or layer-3 virtual network.

3*a*1-02. Receive the second default flow entry of the layer-2 or layer-3 virtual network.

In the example of the layer-2 virtual network, the forwarding device 1 receives the first default flow entry and the second default flow entry of the layer-2 virtual network B, and stores the entries in a layer-2 flow table 1 (as shown in Table 5).

TABLE 5

| Flow table ID | Match item | Priority | Action |
|---|---|---|---|
| 1 | VNID = B | Low | Broadcast the data packet to the forwarding device in the layer-2 virtual network B |
| 1 | VNID = B | High | Send the data packet to the controller |

In this case, the controller works normally, and the ES 1 initiates a layer-2 unicast communication process to the ES 3. When an initial packet (that is, a first data packet) initiated by the ES 1 and destined for the ES 3 arrives at the forwarding device 1, the forwarding device 1 looks up the layer-2 flow table 1 (as shown in Table 5) using a match item whose virtual network identifier is B and whose destination MAC is MAC3, but no flow entry can be accurately hit. In this case, the data packet first hits the first default flow entry and the second default flow entry of the layer-2 virtual network B. Because the priority of the second default flow entry is higher than that of the first default flow entry, the data packet finally hits the second default flow entry, and an action of sending the data packet destined for the ES 3 to the controller is performed. After receiving the data packet destined for the ES 3, the controller generates, for the forwarding device 1, a layer-2 flow entry (as shown in Table 6) destined for the MAC3 in the virtual network B. Then the controller delivers the layer-2 flow entry destined for the MAC3 to the layer-2 flow table 1 of the forwarding device 1. When the forwarding device 1 subsequently receives a data packet from the ES 1 and destined for the ES 3 again, the forwarding device 1 directly uses the match item whose VNID is B and whose MAC is MAC3 to look up the layer-2 flow table 1 and accurately hit the layer-2 flow entry destined for the MAC3, performs a corresponding action to encapsulate the packet using an overlay tunnel (such as a VXLAN tunnel), and sends the packet to the forwarding device 2 connected to the ES 3.

TABLE 6

| Flow table ID | Match item | Priority | Action |
| --- | --- | --- | --- |
| 1 | VNID = B, and destination MAC = MAC3 | 200 | Send the packet to the forwarding device 2 connected to the ES 3 |

In the example of the layer-3 virtual network, the forwarding device 1 receives the first default flow entry and the second default flow entry of the layer-3 virtual network A, and stores the entries in a layer-3 flow table 1 (as shown in Table 7).

TABLE 7

| Flow table ID | Match item | Priority | Action |
| --- | --- | --- | --- |
| 1 | VNID = A | Low | Send the data packet in the layer-3 virtual network to the forwarding device that stores all or some routing and forwarding information in the layer-3 virtual network |
| 1 | VNID = A | High | Send the data packet to the controller |

In this case, the controller works normally, and the ES 1 initiates a layer-3 unicast communication process to the ES 4. When an initial packet (that is, a first data packet) initiated by the ES 1 arrives at the forwarding device 1, the forwarding device 1 looks up the layer-3 flow table 1 (as shown in Table 7) using a match item whose virtual network identifier is A and whose destination IP is IP4, but no flow entry can be accurately hit. In this case, the data packet first hits the first default flow entry and the second default flow entry of the layer-3 virtual network A. Because the priority of the second default flow entry is higher than that of the first default flow entry, the data packet finally hits the second default flow entry, and an action of sending the data packet destined for the ES 4 to the controller is performed. After receiving the data packet destined for the ES 4, the controller generates, for the forwarding device 1, a layer-3 flow entry (as shown in Table 8) destined for the IP4 in the virtual network A. Then the controller delivers the layer-3 flow entry destined for the IP4 to the layer-3 flow table 1 of the forwarding device 1. When the forwarding device 1 subsequently receives a data packet from the ES 1 and destined for the ES 4 again, the forwarding device 1 directly uses the match item whose VNID is A and whose destination IP is IP4 to look up the layer-3 flow table 1 and accurately hit the layer-3 flow entry destined for the IP4, performs a corresponding action to encapsulate the packet using an overlay tunnel (such as a VXLAN tunnel), and sends the packet to the forwarding device 2 connected to the ES 4.

TABLE 8

| Table ID | Match item | Priority | Action |
| --- | --- | --- | --- |
| 1 | VNID = A, and destination IP = IP4 | 200 | Send the packet to the forwarding device 2 connected to the ES 4 |

In the example of the layer-2 or layer-3 virtual network, for example, after receiving a data packet from the ES 1, the forwarding device 1 first resolves a destination MAC address in the data packet, and then compares the destination MAC with a MAC address of the forwarding device 1; if finding after comparison that the MAC addresses are different, the forwarding device 1 looks up the layer-2 flow table 1, and performs layer-2 forwarding; if finding after comparison that the MAC addresses are the same, the forwarding device 1 continues to resolve a destination IP address in the data packet, compares the destination IP address with an IP address of the forwarding device 1; and if the IP addresses are the same, the forwarding device 1 sends the data packet to a control plane for protocol parsing processing; or if the IP addresses are different, the forwarding device 1 looks up the layer-3 flow table 1, and performs layer-3 forwarding.

3a1-03. When knowing that the controller is faulty, set the priority of the first default flow entry of the layer-2 or layer-3 virtual network to be higher than the priority of the second default flow entry of the layer-2 or layer-3 virtual network.

In the example of the layer-2 virtual network, in the layer-2 flow table 1, the first default flow entry and the second default flow entry of the layer-2 virtual network B whose priorities are changed are shown in Table 9.

TABLE 9

| Flow table ID | Match item | Priority | Action |
| --- | --- | --- | --- |
| 1 | VNID = A | High | Send the data packet in the layer-3 virtual network to the forwarding device that stores all or some routing and forwarding information in the layer-3 virtual network |
| 1 | VNID = A | Low | Send the data packet to the controller |

In the example of the layer-3 virtual network, in the layer-3 flow table 1, the first default flow entry and the second default flow entry of the layer-3 virtual network A whose priorities are changed are shown in Table 10.

TABLE 10

| Flow table ID | Match item | Priority | Action |
|---|---|---|---|
| 1 | VNID = A | High | Send the data packet in the layer-3 virtual network to the forwarding device that stores all or some routing and forwarding information in the layer-3 virtual network |
| 1 | VNID = A | Low | Send the data packet to the controller |

3a1-04. Receive a first data packet from the ES 1.

3a1-05. When the forwarding device looks up the first flow table based on a match item of the first data packet but no flow entry is hit, the forwarding device sends the first data packet to the specified forwarding device using the first default flow entry of the layer-2 or layer-3 virtual network.

In the example of the layer-2 virtual network, when the controller is faulty, the ES 1 initiates a layer-2 unicast communication process to the ES 5. When an initial packet (that is, a first data packet) initiated by the ES 1 and destined for the ES 5 arrives at the forwarding device 1, the forwarding device 1 looks up a layer-2 flow table 1 (as shown in Table 9) using a match item whose virtual network identifier is B and whose destination MAC is MAC5, but no flow entry can be accurately hit. In this case, the data packet hits the first default flow entry and the second default flow entry of the layer-2 virtual network B. Because the priority of the first default flow entry is higher than that of the second default flow entry, the data packet finally hits the first default flow entry, and the data packet destined for the ES 5 is broadcasted to a forwarding device in the layer-2 virtual network B, that is, the data packet is broadcasted to the forwarding devices 2 and 3.

The first default flow entry of the layer-2 virtual network B is set, and this avoids a problem that when the controller is faulty, communication is interrupted because the initial packet from the ES 1 to the ES 5 cannot be sent to the controller and an accurately matched layer-2 flow entry cannot be generated.

After the forwarding device 1 detects fault recovery of the controller, the forwarding device 1 sets the priority of the first default flow entry of the layer-2 virtual network B to be lower than the priority of the second default flow entry. Then, according to the foregoing process, the forwarding device 1 receives a data packet initiated by the ES 1 and destined for the ES 5, selects the higher-priority second default flow entry from the two default flow entries when the forwarding device 1 looks up the layer-2 flow table 1 but no flow entry can be accurately hit, and sends the data packet to the controller. The controller generates a layer-2 flow entry that is accurately matched for the forwarding device 1, and delivers the layer-2 flow entry to the forwarding device 1 to guide subsequent layer-2 forwarding (where a process is consistent with the process in which the controller generates the flow entry shown in Table 6 when the controller is normal in the foregoing step 3a1-02, and is not described again herein).

The forwarding device 1 detects whether the controller is faulty, and flexibly adjusts the priorities of the first and second default flow entries of the layer-2 virtual network. Therefore, after the data packet is received, the higher-priority first default flow entry can be directly matched. There is no need to wait for confirming a status of the controller after the packet is received, and then determining a default flow entry to be used. Therefore, efficiency of packet forwarding can be improved. It may be understood that, from a perspective of knowing the status of the controller in real time, alternatively, after the data packet is received, the status of the controller may be queried, and after it is confirmed that the controller is faulty or recovers from the fault, the default flow entry to be used for forwarding is determined.

It should be noted that, when the controller works normally, the forwarding device 1 may also flexibly adjust, based on a design requirement or an application scenario, the priority of the first default flow entry to be higher than the priority of the second default flow entry, such that the data packet destined for the ES 5 can be flexibly broadcast to a forwarding device in the layer-2 virtual network B when no match item is hit. Therefore, flexibility of setting a system based on a requirement is improved.

In the example of the layer-3 virtual network, when the controller is faulty, the ES 1 initiates a layer-3 unicast communication process to the ES 6. When an initial packet (that is, a first data packet) initiated by the ES 1 arrives at the forwarding device 1, the forwarding device 1 looks up a layer-3 flow table 1 (as shown in Table 10) using a match item whose virtual network identifier is A and whose destination IP is IP6, but no flow entry can be accurately hit. In this case, the data packet hits the first default flow entry and the second default flow entry of the layer-3 virtual network A. Because the priority of the first default flow entry is higher than that of the second default flow entry, the data packet finally hits the first default flow entry, and the data packet destined for the ES 6 is sent to the forwarding device that stores all or some routing and forwarding information in the layer-3 virtual network A, that is, sent to the centralized forwarding device.

The first default flow entry of the layer-3 virtual network A is set, and this avoids a problem that when the controller is faulty, communication is interrupted because the initial packet from the ES 1 to the ES 6 cannot be sent to the controller and an accurately matched layer-3 flow entry cannot be generated.

After the forwarding device 1 detects fault recovery of the controller, the forwarding device 1 sets the priority of the first default flow entry of the layer-3 virtual network A to be lower than the priority of the second default flow entry. Then, according to the foregoing process, the forwarding device 1 receives a data packet initiated by the ES 1 and destined for the ES 6, selects the higher-priority second default flow entry from the two default flow entries when the forwarding device 1 looks up the layer-3 flow table 1 but no flow entry can be accurately hit, and sends the data packet to the controller. The controller generates a layer-3 flow entry that is accurately matched for the forwarding device 1, and delivers the layer-3 flow entry to the forwarding device 1 to guide subsequent forwarding (where a process is consistent with the process in which the controller generates the flow entry shown in Table 7 when the controller is normal in the foregoing step 3a1-02, and is not described again herein).

The forwarding device detects whether the controller is faulty, and flexibly adjusts the priorities of the first and second default flow entries of the layer-3 virtual network. Therefore, after the data packet is received, the higher-priority first default flow entry can be directly matched. There is no need to wait for confirming the status of the controller after the packet is received, and then determining a default flow entry to be used. Therefore, efficiency of packet forwarding can be improved. It may be understood that, from the perspective of knowing the status of the controller in real time, alternatively, after the data packet is received, the status of the controller may be queried, and after it is confirmed that the controller is faulty or recovers from the fault, the default flow entry to be used for forwarding is determined.

It should be noted that, when the controller works normally, the forwarding device 1 may also flexibly adjust, based on a design requirement or an application scenario, the priority of the first default flow entry to be higher than the priority of the second default flow entry, such that the data packet destined for the ES 6 can be flexibly sent to the centralized forwarding device in the layer-3 virtual network A when no match item is hit. Therefore, flexibility of setting the system based on a requirement is improved.

FIG. 3B-1, FIG. 3B-2, and FIG. 3B-3 are schematic interaction flowcharts of a method when default flow entries are in different flow tables (a refined example of related parts of the method embodiment in FIG. 2). The method embodiment is similar to the method embodiment in FIG. 3A-1 and FIG. 3A-2. In both embodiments, the first default flow entry of the layer-2 or layer-3 virtual network is set, such that the forwarding device is allowed to finally hit the first default flow entry for guiding forwarding when the controller is faulty. A difference lies in that the first default flow entry of the layer-2 or layer-3 virtual network and the second default flow entry of the layer-2 or layer-3 virtual network are stored in different flow tables in the method embodiment shown in FIG. 3B-1, FIG. 3B-2, and FIG. 3B-3. This embodiment of the present disclosure further includes third and fourth default flow entries of the layer-2 or layer-3 virtual network, such that the first default flow entry or the second default flow entry is selectively hit based on a faulty or normal working state of the controller. The third and fourth default flow entries are stored in a third flow table, as shown in FIG. 4. If the controller is faulty, when the forwarding device looks up the table for forwarding, a data packet may hit the third default flow entry, and an action of jumping to the first flow table to hit the first default flow entry may be performed. If the controller works normally, when the forwarding device looks up the table for forwarding, the forwarding device is enabled to hit the fourth default flow entry, and may perform an action of jumping to a second flow table to hit the second default flow entry.

With reference to the schematic flowchart shown in FIG. 3B-1, FIG. 3B-2, and FIG. 3B-3 and the scenario shown in FIG. 1, the following describes a process of interaction between the controller and the forwarding device 1 in the method shown in FIG. 3B-1, FIG. 3B-2, and FIG. 3B-3 using an example in which the forwarding device 1 is in the layer-2 virtual network B and the layer-3 virtual network A respectively, similarly to the embodiment shown in FIG. 3A-1 and FIG. 3A-2. The scenario shown in FIG. 1 is consistent with the foregoing descriptions about FIG. 3A-1 and FIG. 3A-2. Refer to corresponding steps. Details are not described again herein.

When the controller works in pull mode, after creating the layer-2 and/or layer-3 virtual network successfully, the controller performs steps 3b2-01 to 3b2-08 shown in FIG. 3B-1, FIG. 3B-2, and FIG. 3B-3, where steps 3b2-01 to 3b2-04 are similar to steps 3a2-01 to 3a2-04 described in FIG. 3A-1 and FIG. 3A-2 (for details, refer to corresponding parts, and details are not described again herein). A difference lies in that the second default flow entry of the layer-2 or layer-3 virtual network in the embodiment shown in FIG. 3B-1, FIG. 3B-2, and FIG. 3B-3 is an entry in the second flow table and is stored in the second flow table of the forwarding device 1.

In addition, the controller further performs steps 3b2-05 to 3b2-08 to generate a third default flow entry and a fourth default flow entry of the layer-2 or layer-3 virtual network and send the third default flow entry and the fourth default flow entry to the forwarding device 1, where a priority of the third default flow entry is lower than a priority of the fourth default flow entry. Functions of the third and fourth default flow entries of the layer-2 or layer-3 virtual network are similar to functions of the first and second default flow entries (for details, refer to the foregoing corresponding parts in FIG. 2 and FIG. 3A-1 and FIG. 3A-2, and details are not described again herein). Differences are as follows: (1) The third and fourth default flow entries are entries in the third flow table. (2) Performed actions are different, where the third default flow entry instructs to send a corresponding data packet based on the first flow table when no flow entry is accurately hit during lookup of the third flow table (for example, an action may be jumping to the first flow table for sending and then looking up the first flow table for forwarding); and the fourth default flow entry instructs to send a corresponding data packet based on the second flow table when no flow entry is accurately hit during lookup of the third flow table (for example, an action may be jumping to the second flow table for sending and then looking up the second flow table for forwarding).

In the example of the layer-2 virtual network, the controller sends the third and fourth default flow entries (as shown in Table 11) of the layer-2 virtual network B that are generated for the forwarding device 1 in the foregoing steps 3b2-05 to 3b2-08 to the forwarding device 1.

TABLE 11

| Flow table ID | Match item | Priority | Action |
| --- | --- | --- | --- |
| 3 | VNID = B | Low | Send the data packet based on the first flow table |
| 3 | VNID = B | High | Send the data packet based on the second flow table |

In the example of the layer-3 virtual network, the controller sends the third and fourth default flow entries (as shown in Table 12) of the layer-3 virtual network A that are generated for the forwarding device 1 in the foregoing steps 3b2-05 to 3b2-08 to the forwarding device 1.

TABLE 12

| Flow table ID | Match item | Priority | Action |
| --- | --- | --- | --- |
| 3 | VNID = A | Low | Send the data packet based on the first flow table |
| 3 | VNID = A | High | Send the data packet based on the second flow table |

It should be noted that, a sequence of generating the first, second, third, and fourth default flow entries of the layer-2 or layer-3 virtual network by the controller is not limited. The default flow entries may be generated in combination in any sequence. A sequence of delivering the first, second, third, and fourth default flow entries by the controller to the forwarding device 1 is not limited either. The default flow entries may be delivered separately one by one, or any quantity thereof may be combined and added to one or more control channel protocol messages and delivered in any sequence. This is not limited herein.

Steps 3*b*1-01 to 3*b*1-07 shown in FIG. 3B-1, FIG. 3B-2, and FIG. 3B-3 are performed on the forwarding device 1, where steps 3*b*1-01 and 3*b*1-02 are consistent with the foregoing steps 3*a*1-01 and 3*a*1-02 described in FIG. 3A-1 and FIG. 3A-2 (for details, refer to corresponding parts, and details are not described again herein). A difference lies in that the second default flow entry of the layer-2 or layer-3 virtual network in the embodiment shown in FIG. 3B-1, FIG. 3B-2, and FIG. 3B-3 is an entry in the second flow table and is stored in the second flow table of the forwarding device 1.

Figures 1, 3B:
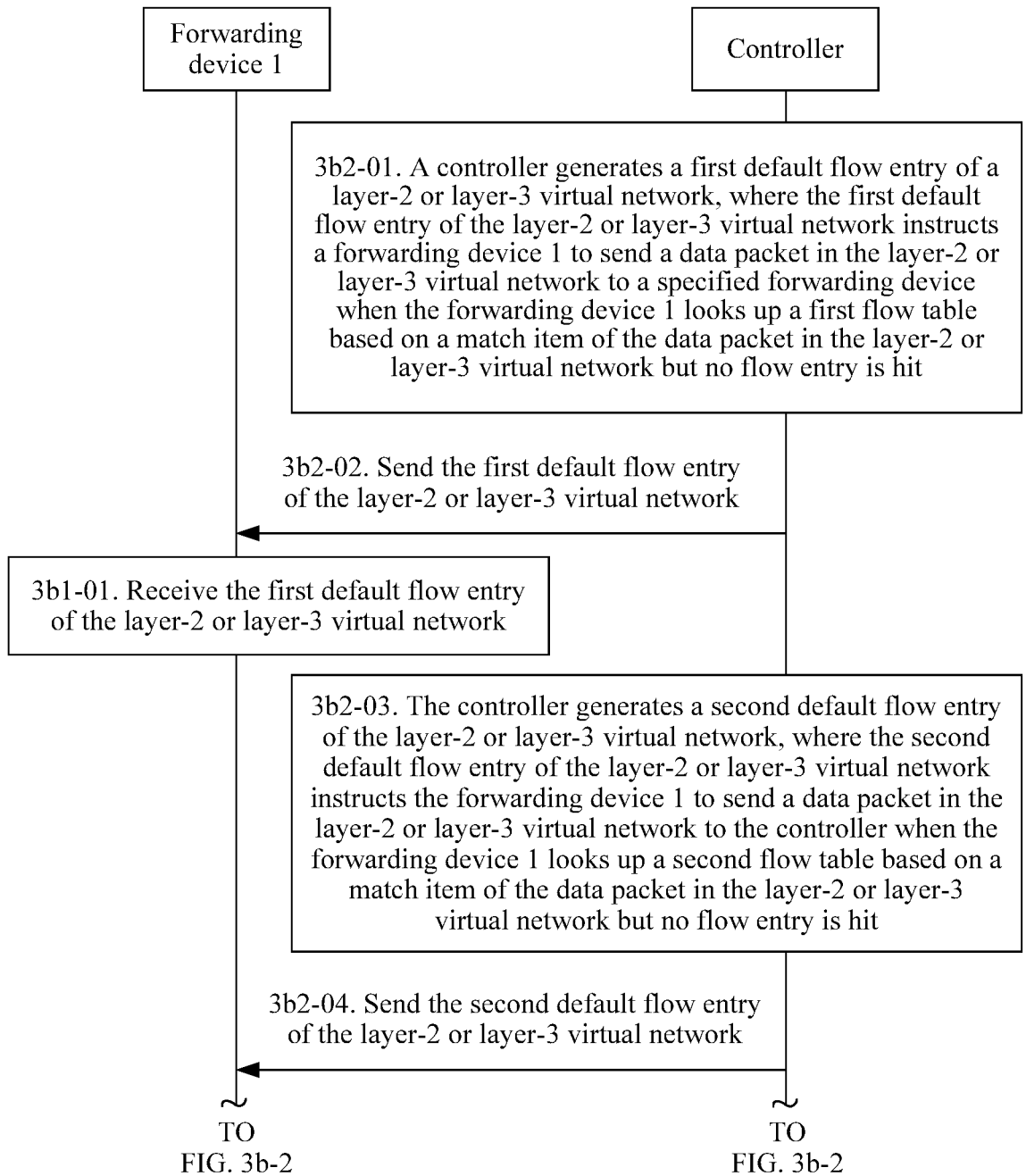
Figures 2, 3B:
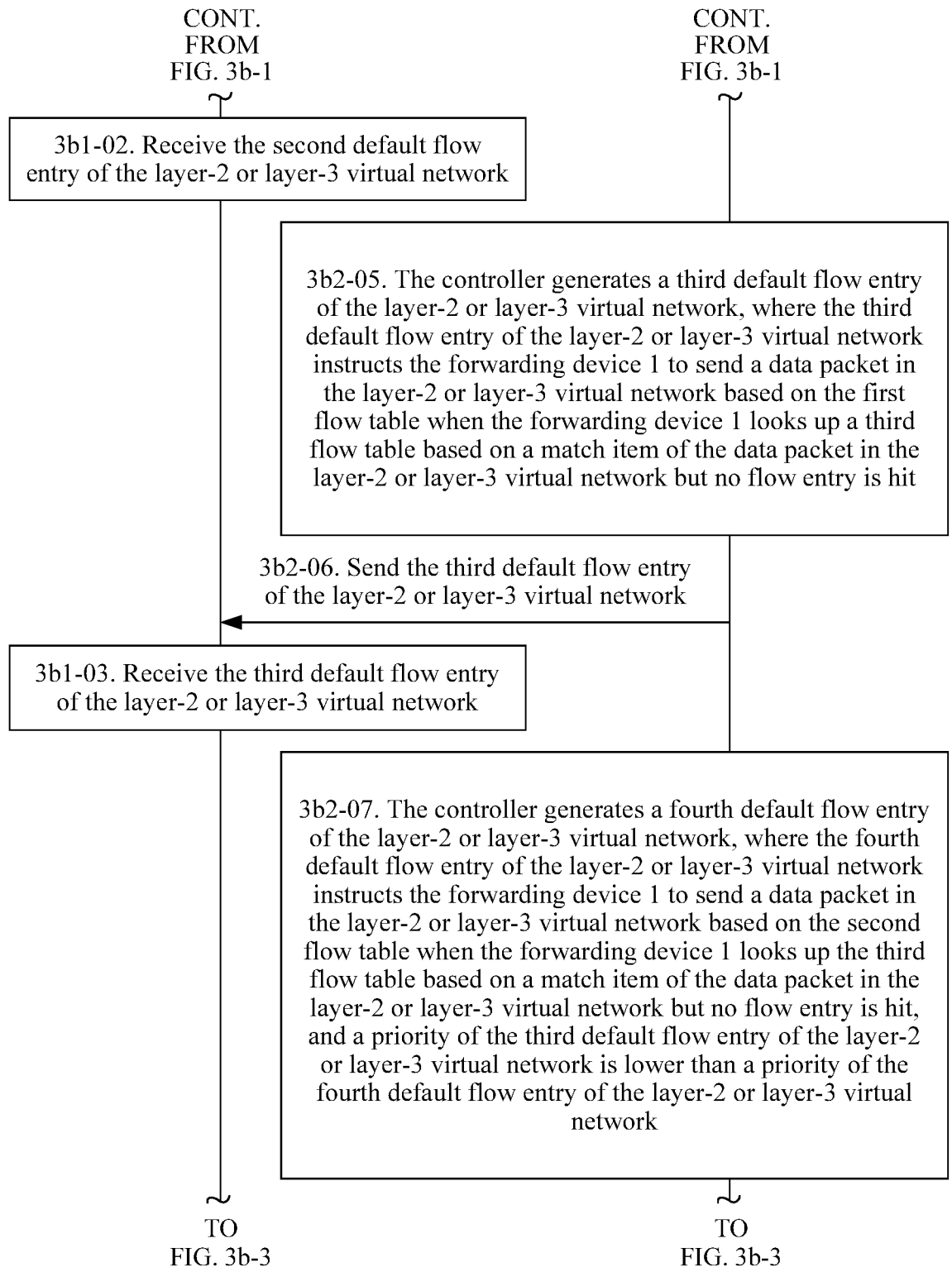
Figures 3, 3B:
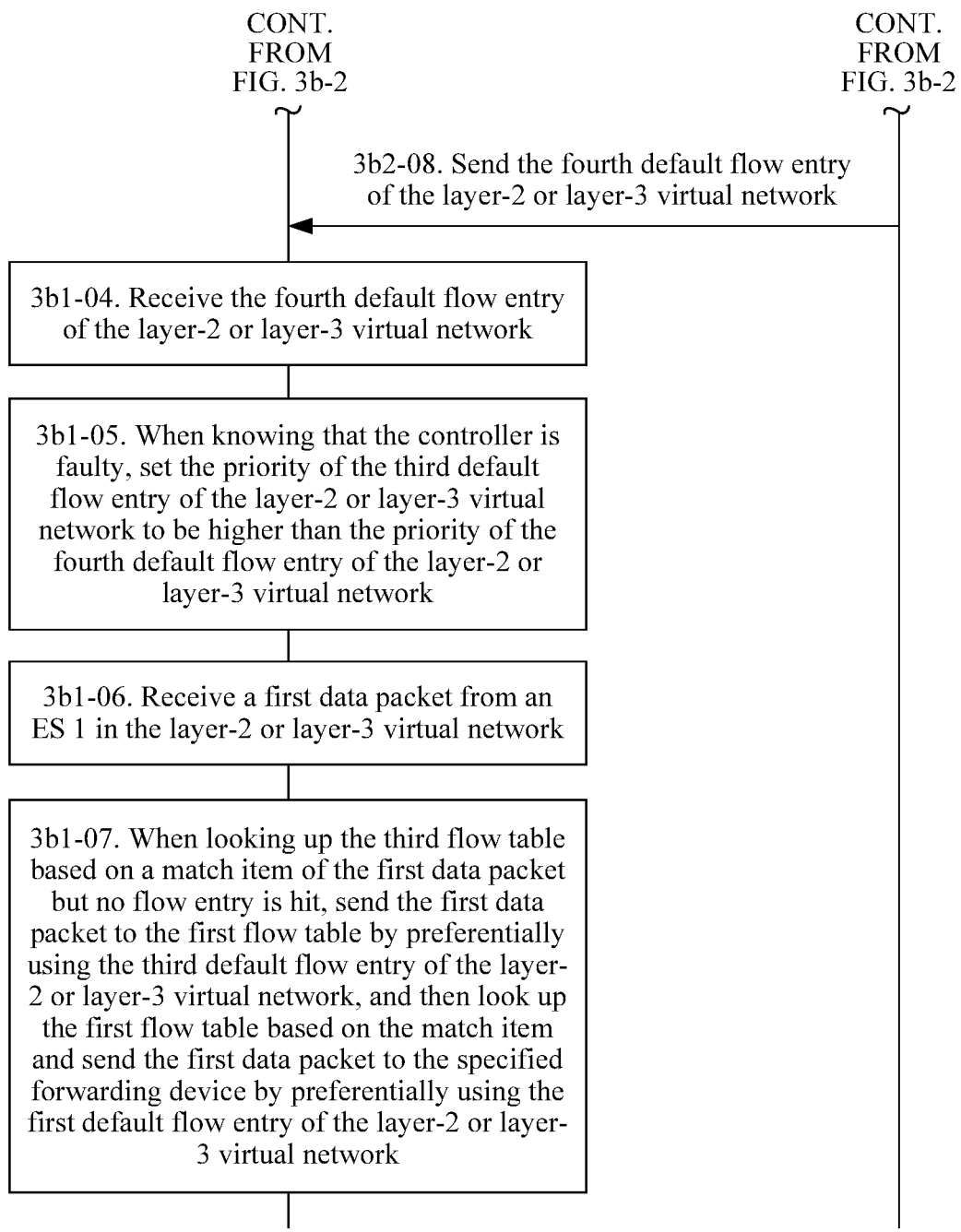
Figure 4:
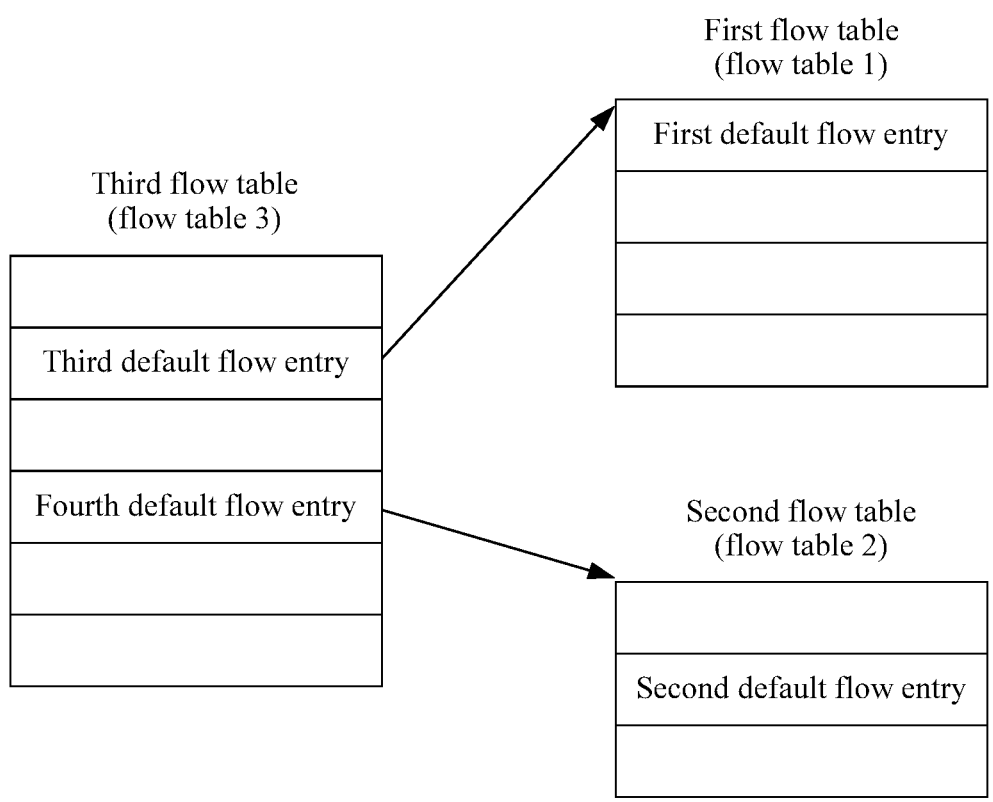
FIG. 4 is a schematic diagram of a flow table go to relationship according to an embodiment of the present disclosure.

In addition, optionally, the forwarding device 1 may further perform steps 3*b*1-03 and 3*b*2-04 shown in FIG. 3B-2 and FIG. 3B-3 to receive the third default flow entry and the fourth default flow entry of the layer-2 or layer-3 virtual network that are sent by the controller, where the priority of the third default flow entry is lower than the priority of the fourth default flow entry. Descriptions about the third and fourth default flow entries of the layer-2 or layer-3 virtual network are consistent with the descriptions in the foregoing steps 3*b*2-05 to 3*b*2-08 performed by the controller. Details are not described again herein.

In the example of the layer-2 virtual network, when the controller works normally, for example, the ES 1 in FIG. 1 initiates a layer-2 unicast communication process to the ES 3. When an initial packet (that is, a first data packet) initiated by the ES 1 and destined for the ES 3 arrives at the forwarding device 1, the forwarding device 1 looks up a flow table 3 (as shown in Table 11) using a match item whose virtual network identifier is B and whose destination MAC is MAC3, but no flow entry can be accurately hit. In this case, the data packet first hits the third default flow entry and the fourth default flow entry of the layer-2 virtual network B. Because the priority of the fourth default flow entry is higher than that of the third default flow entry, finally the fourth default flow entry is hit, and the data packet destined for the ES 3 is sent based on a layer-2 flow table 2 (for example, an action may be jumping to the layer-2 flow table 2 for sending and then looking up the layer-2 flow table 2 for forwarding). Then the forwarding device 1 looks up the layer-2 flow table using the match item whose virtual network identifier is B and whose destination MAC is MAC3, but no match item is accurately hit. In this case, the forwarding device 1 selects the second default flow entry of the layer-2 virtual network, and sends the data packet destined for the ES 3 to the controller. After receiving the data packet destined for the ES 3, the controller generates, for the forwarding device 1, a layer-2 flow entry (as shown in Table 6) destined for the MAC3 in the virtual network B. Then the controller delivers the layer-2 flow entry destined for the MAC3 to a layer-2 flow table 3 (that is, the third flow table) of the forwarding device 1. When the forwarding device 1 subsequently receives a data packet from the ES 1 and destined for the ES 3 again, the forwarding device 1 directly uses the match item whose VNID is B and whose MAC is MAC3 to look up the layer-2 flow table 3 and accurately hit the layer-2 flow entry destined for the MAC3, performs a corresponding action to encapsulate the packet using an overlay tunnel (such as a VXLAN tunnel), and sends the packet to the forwarding device 2 connected to the ES 3.

In the example of the layer-3 virtual network, when the controller works normally, the ES 1 initiates a layer-3 unicast communication process to the ES 4. When an initial packet (that is, a first data packet) initiated by the ES 1 arrives at the forwarding device 1, the forwarding device 1 looks up a layer-3 flow table 3 (as shown in Table 12) using a match item whose virtual network identifier is A and whose destination IP is IP4, but no flow entry can be accurately hit. In this case, the data packet first hits the third default flow entry and the fourth default flow entry of the layer-3 virtual network A. Because the priority of the fourth default flow entry is higher than that of the third default flow entry, the data packet finally hits the fourth default flow entry, and the data packet destined for the ES 4 is sent based on a layer-3 flow table 2 (for example, an action may be jumping to the layer-3 flow table 2 for sending and then looking up the layer-3 flow table 2 for forwarding). Then the forwarding device 1 looks up the layer-3 flow table 2 using the match item whose virtual network identifier is A and whose destination IP is IP4, but no match item is accurately hit. In this case, the forwarding device 1 selects the second default flow entry of the layer-2 virtual network, and sends the data packet destined for the ES 4 to the controller. After receiving the data packet destined for the ES 4, the controller generates, for the forwarding device 1, a layer-3 flow entry (as shown in Table 8) destined for the IP4 in the virtual network A. Then the controller delivers the layer-3 flow entry destined for the IP4 to the layer-3 flow table 3 of the forwarding device 1. When the forwarding device 1 subsequently receives a data packet from the ES 1 and destined for the ES 4 again, the forwarding device 1 directly uses the match item whose VNID is A and whose destination IP is IP4 to look up the layer-3 flow table 3 and accurately hit the layer-3 flow entry destined for the IP4, performs a corresponding action to encapsulate the packet using an overlay tunnel (such as a VXLAN tunnel), and sends the packet to the forwarding device 2 connected to the ES 4.

Further, the forwarding device 1 may further perform steps 3*b*1-05 to 3*b*1-07. The steps are similar to the foregoing steps 3*a*1-03 to 3*a*1-05 described in FIG. 3A-2 (for details, refer to corresponding parts, and details are not described again herein). A difference lies in that in the embodiment shown in FIG. 3B-1, FIG. 3B-2, and FIG. 3B-3, the priority of the third default flow entry of the layer-2 or layer-3 virtual network in the third flow table is set to be higher than the priority of the fourth default flow entry of the layer-2 or layer-3 virtual network in the third flow table. Therefore, when the controller is faulty and the forwarding device 1 looks up the table, the third default flow entry can be hit, such that the forwarding device 1 jumps to the first flow table and further uses the first default flow entry of the layer-2 or layer-3 virtual network in the first flow table to forward the data packet to the specified forwarding device.

In the example of the layer-2 virtual network, when the controller is faulty, for example, the ES 1 in FIG. 1 initiates a layer-2 unicast communication process to the ES 5. When an initial packet (that is, a first data packet) initiated by the ES 1 and destined for the ES 5 arrives at the forwarding device 1, the forwarding device 1 looks up the layer-2 flow table 3 using a match item whose virtual network identifier is B and whose destination MAC is MACS, but no flow entry can be accurately hit. In this case, the data packet first hits the third default flow entry and the fourth default flow entry of the layer-2 virtual network B. Because the priority of the third default flow entry is higher than that of the fourth default flow entry in this case, finally the third default flow entry is hit, and the data packet destined for the ES 5 is sent based on the layer-2 flow table 2 (for example, an action may be jumping to the layer-2 flow table 2 for sending and then looking up the layer-2 flow table 2 for forwarding). Then the forwarding device 1 looks up a layer-2 flow table 1 using the match item whose virtual network identifier is B and whose destination MAC is MACS, but the match item is not accurately hit (or the forwarding device 1 may look up a layer-2 flow table 1 using a match item whose virtual network identifier is B, and the first default flow entry of the layer-2 virtual network is accurately hit). In this case, the forwarding device 1 uses the first default flow entry of the layer-2 virtual network, and broadcasts the data packet destined for the ES 5 to a forwarding device in the layer-2 virtual network B, that is, broadcasts the data packet to the forwarding devices 2 and 3. After receiving the data packet, the forwarding device 3 connected to the ES 5 sends the data packet to the ES 5.

The first default flow entry of the layer-2 virtual network B is set, and this avoids a problem that when the controller is faulty, communication is interrupted because the initial packet from the ES 1 to the ES 5 cannot be sent to the controller and an accurately matched layer-2 flow entry cannot be generated.

In the example of the layer-3 virtual network, when the controller is faulty, the ES 1 initiates a layer-3 unicast communication process to the ES 6. When an initial packet (that is, a first data packet) initiated by the ES 1 arrives at the forwarding device 1, the forwarding device 1 looks up the layer-3 flow table 3 using a match item whose virtual network identifier is A and whose destination IP is IP6, but no flow entry can be accurately hit. In this case, the data packet first hits the third default flow entry and the fourth default flow entry of the layer-3 virtual network A. Because the priority of the third default flow entry is higher than that of the fourth default flow entry in this case, the data packet finally hits the third default flow entry, and the data packet destined for the ES 6 is sent based on a layer-3 flow table 1 (for example, an action may be jumping to the layer-3 flow table 1 for sending and then looking up the layer-3 flow table 1 for forwarding). Then the forwarding device 1 looks up the layer-3 flow table 1 using the match item whose virtual network identifier is A and whose destination IP is IP6, but the match item is not accurately hit (or the forwarding device 1 may look up the layer-2 flow table 1 using a match item whose virtual network identifier is A, and the first default flow entry of the layer-2 virtual network is accurately hit). In this case, the forwarding device 1 uses the first default flow entry of the layer-3 virtual network, and sends the data packet destined for the ES 6 to a forwarding device that stores all or some routing and forwarding information in the layer-3 virtual network A, that is, sends the data packet to the centralized forwarding device. After receiving the data packet, the centralized forwarding device looks up the routing and forwarding information of the layer-3 virtual network A, and sends the data packet to the ES 6 through a tunnel (such as a VXLAN tunnel).

The first default flow entry of the layer-3 virtual network A is set, and this avoids a problem that when the controller is faulty, communication is interrupted because the initial packet from the ES 1 to the ES 6 cannot be sent to the controller and an accurately matched layer-3 flow entry cannot be generated.

It should be noted that, in the layer-2 or layer-3 virtual network, a process in which the forwarding device 1 flexibly adjusts the priorities of the third and fourth default entries after detecting that the controller recovers from the fault, to send a data packet to the controller, is similar to that described in the 3*a*1-05 in FIG. 3A-2. A difference lies in that jumping between flow tables is added. For brevity, details are not described again herein. In addition, when the controller works normally, a process of flexibly adjusting the priorities of the third and fourth default entries based on a design requirement or an application scenario to send a data packet to the specified forwarding device, is similar to that described in the 3*a*1-05 in FIG. 3A-2. A difference lies in that jumping between flow tables is added. For brevity, details are not described again herein.

It should be noted that, in the foregoing method embodiments in FIG. 3A-1 and FIG. 3A-2, and FIG. 3B-1, FIG. 3B-2, and FIG. 3B-3, the forwarding device 1 is used as an example for description. The same process is also applicable to the forwarding devices 2 and 3. For brevity, the forwarding devices 2 and 3 are not described. The first, second, third, or fourth default flow entry used in the present disclosure is the first, second, third, or fourth default flow entry in the layer-2 virtual network or layer-3 virtual network. Sometimes for brevity of description, the defined layer-2 or layer-3 virtual network is omitted when a context is clear.

It should be noted that, in this application, the layer-2 flow entry is a flow entry whose match item includes a MAC address, and the layer-3 flow entry is a flow entry whose match item includes an IP address. The layer-2 flow table is a flow table used for storing the layer-2 flow entry, and the layer-3 flow table is a flow table used for storing the layer-3 flow entry. The layer-2 flow entry and the layer-3 flow entry may be separately placed in two independent flow tables. For example, the layer-2 flow entry is placed in the layer-2 flow table, and the layer-3 flow entry is placed in the layer-3 flow table. Alternatively, the layer-2 flow entry and the layer-3 flow entry may be placed in one flow table, where the flow table includes both the layer-2 flow entry and the layer-3 flow entry. In this case, the flow table is a flow table with mixed layer-2 and layer-3 flow entries, and may be referred to as a layer-2 flow table, or may be referred to as a layer-3 flow table.

It should also be noted that, the present disclosure is described above using a virtual data center network based on an SDN in which control and forwarding are separated as an example. However, this is not limited. The present disclosure may be further applied to another virtual network based on an SDN in which control and forwarding are separated, for example, a virtual metropolitan area network or backbone network based on an SDN in which control and forwarding are separated. A principle of an implementation method in the metropolitan area network or backbone network in the present disclosure is similar to that of the implementation method in the scenario of the data center network. A difference lies in that in the present disclosure, the ES may also be a layer-2 or layer-3 forwarding device, for example, a customer edge (CE) device; and the tunnel in the present disclosure may also be a layer 2 (L2) virtual private network (L2VPN) tunnel or a layer 3 (L3) virtual private network (L3VPN) tunnel.

Figure 5A:
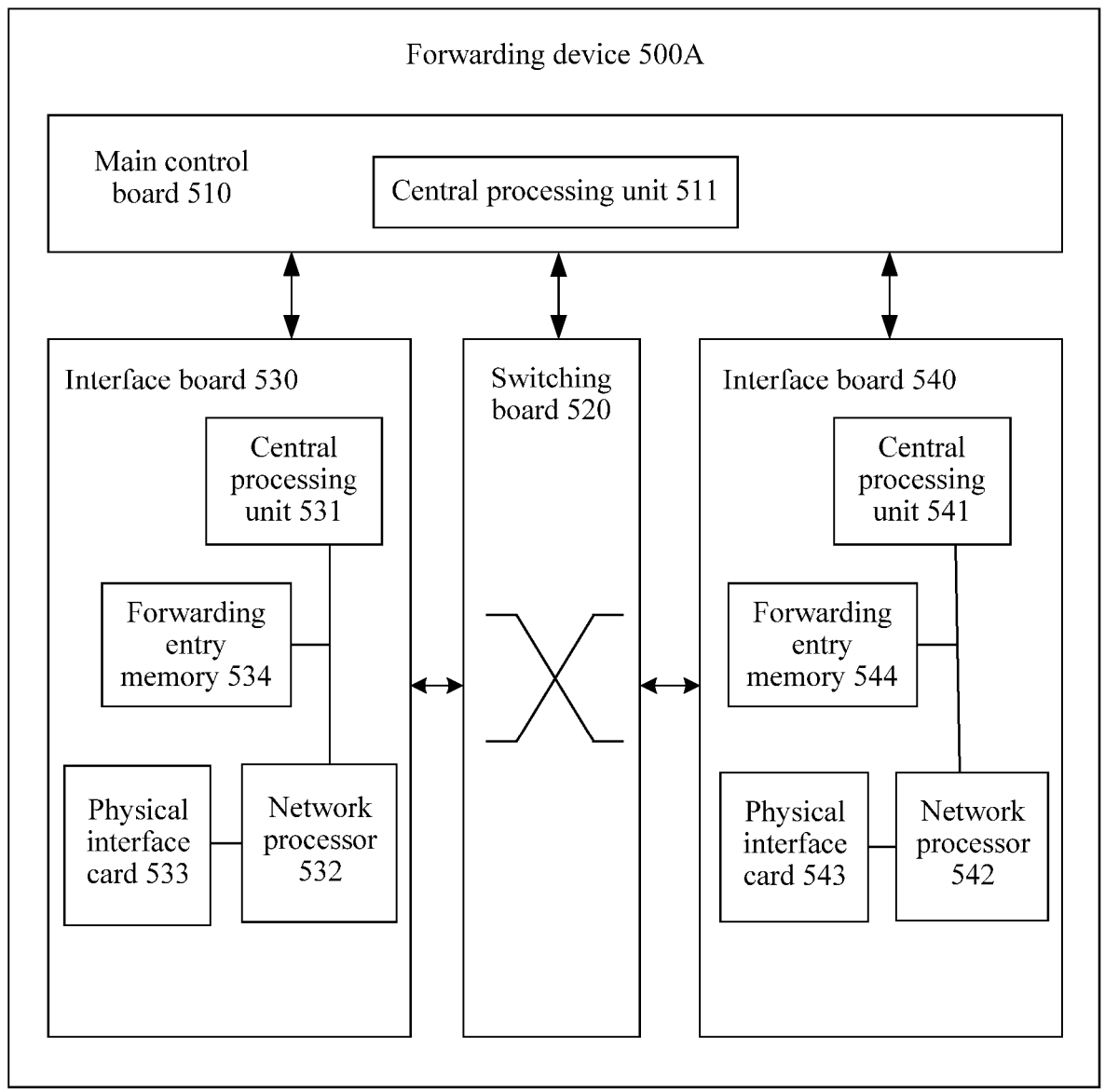
FIG. 5A is a schematic structural diagram of a forwarding device according to an embodiment of the present disclosure.

FIG. 5A is a possible schematic structural diagram of a forwarding device used in the foregoing embodiment. A forwarding device 500A is applied to a virtual network in which control and forwarding are separated. The virtual network includes a controller and the forwarding device 500A. The forwarding device 500A includes a main control board 510, an interface board 530, a switching board 520, and an interface board 540. The main control board 510 is configured to implement functions such as system management, device maintenance, and protocol processing. The switching board 520 is configured to implement data switching between various interface boards (where the interface boards are also referred to as line cards or service boards). The interface boards 530 and 540 are configured to provide various service interfaces (for example, an Ethernet interface and a Packet-over-SONET/SDH (POS) interface), and implement data packet forwarding. The main control board 510, the interface boards 530 and 540, and the switching board 520 are interconnected to each other and implement interworking using a system bus and a system backplane. A central processing unit 531 on the interface board 530 is configured to control and manage the interface board and communicate with a central processing unit 511 on the main control board 510. The central processing unit 511 on the main control board 510 is further configured to communicate with the controller, and process a message (for example, flow entry information) delivered by the controller to the forwarding device 500A.

A physical interface card 533 on the interface board 530 (for example, a port 1 on the interface card, where the port 1 can be used to connect to the controller) is configured to receive a first default flow entry of the virtual network from the controller (for details, refer to the descriptions about related parts in FIG. 2 and FIG. 3A-1 and FIG. 3A-2, and details are not described again herein; for example, the first default flow entry is encapsulated in an OpenFlow message). The message is sent to a network processor 532 on the interface board 530. After looking up a forwarding entry, the network processor 532 finds that it is a host route (where a destination IP address in a header of the message is an IP address of the forwarding device 500A), and sends the message to the central processing unit 511 on the main control board 510 using the central processing unit 531 on the interface board 530.

The central processing unit 511 on the main control board 510 stores the first default flow entry of the virtual network from the controller in forwarding entry memories 534 and 544 respectively using the central processing unit 531 on the interface board 530 and a central processing unit 541 on the interface board 540 respectively. The physical interface card 533 on the interface board 530 (for example, a port 2 on the interface card) is configured to receive a first data packet from an ES. When the controller is faulty, and the forwarding device looks up, based on a match item of the first data packet, a first flow table stored in the forwarding entry memory 534 but no flow entry is hit, the central processing unit 511 on the main control board 510 is further configured to determine to use the first default flow entry of the virtual network to forward the first data packet, and deliver an instruction to the first flow table in the memory 534. The network processor 532 on the interface board 530 receives the first data packet, and looks up the first flow table in the forwarding entry memory 534 based on the match item of the first data packet but no entry is accurately hit. In this case, the first default flow entry of the virtual network is hit. Based on the first default flow entry, the network processor 532 instructs the physical interface card 533 or 543 to send the first data packet to a specified forwarding device. For example, if the specified forwarding device is connected to the physical interface card 533, the network processor 532 instructs the physical interface card 533 to send the first data packet; or if the specified forwarding device is connected to the physical interface card 543, the network processor 532 instructs to send the first data packet to the interface board 540 using the switching board 520, and then the physical interface card 543 sends the first data packet.

Optionally, the physical interface card 533 on the interface board 530 (for example, the port 1 on the interface card) further receives a second default flow entry of the virtual network from the controller. Depending on whether the second default flow entry of the virtual network and the first default flow entry of the virtual network are stored in a same flow table, there are the following two possible implementations.

Manner 1 is an implementation in which default flow entries are entries in a same flow table.

Based on manner 1, in a possible implementation, in a process similar to the foregoing process of delivering the first default flow entry, the central processing unit 511 on the main control board 510 further stores the second default flow entry of the virtual network from the controller (for details, refer to the descriptions about the related parts in FIG. 2 and FIG. 3A-1 and FIG. 3A-2, and details are not described again herein, where the second default flow entry is an entry in the first flow table) in the forwarding entry memories 534 and 544 respectively. A priority of the second default flow entry of the virtual network is higher than a priority of the first default flow entry of the virtual network. The central processing unit 511 on the main control board 510 is further configured to determine to use the second default flow entry of the virtual network to forward the first data packet when the controller works normally and the forwarding device looks up the first flow table based on the match item of the first data packet but no flow entry is hit.

Based on manner 1, in another possible implementation, the central processing unit 511 on the main control board 510 is further configured to set the priority of the first default flow entry of the virtual network to be higher than the priority of the second default flow entry of the virtual network after determining that the controller is faulty. The network processor 532 on the interface board 530 is further configured to instruct the physical interface card 533 or 543 to send the first data packet based on the first default flow entry of the virtual network.

Manner 2 is an implementation in which default flow entries are entries in different flow tables.

Based on manner 2, in a possible implementation, in a process similar to the foregoing process of delivering the first default flow entry, the central processing unit 511 on the main control board 510 further delivers and stores the second default flow entry of the virtual network from the controller (for details, refer to the descriptions about the related parts in FIG. 2 and FIG. 3A-1 and FIG. 3A-2, and details are not described again herein, where the second default flow entry is an entry in a second flow table) to the forwarding entry memories 534 and 544 respectively. A priority of the second default flow entry of the virtual network is higher than a priority of the first default flow entry of the virtual network.

Based on manner 2, in another possible implementation, in a process similar to the foregoing process of delivering the first default flow entry, the physical interface card 533 on the interface board 530 (for example, the port 1 on the interface card) further receives a third default flow entry of the virtual network from the controller (for details, refer to the descriptions about the related parts in FIG. 2 and FIG. 3B-1, FIG. 3B-2, and FIG. 3B-3, and details are not described again herein, where the third default flow entry of the virtual network is an entry in a third flow table). The central processing unit 511 on the main control board 510 further delivers and stores the third default flow entry of the virtual network to the forwarding entry memories 534 and 544 respectively. The central processing unit 511 on the main control board 510 is further configured to determine to use the third default flow entry of the virtual network to forward the first data packet when the controller is faulty and the forwarding device looks up the third flow table based on the match item of the first data packet but no flow entry is hit.

Based on manner 2, in still another possible implementation, in a process similar to the foregoing process of delivering the first default flow entry, the physical interface card 533 on the interface board 530 (for example, the port 1 on the interface card) further receives a fourth default flow entry of the virtual network from the controller (for details, refer to the descriptions about the related parts in FIG. 2 and FIG. 3B-1, FIG. 3B-2, and FIG. 3B-3, and details are not described again herein, where the fourth default flow table of the virtual network is an entry in the third flow table). The central processing unit 511 on the main control board 510 further delivers and stores the fourth default flow entry of the virtual network to the forwarding entry memories 534 and 544 respectively. A priority of the fourth default flow entry of the virtual network is higher than a priority of the third default flow entry of the virtual network. The central processing unit 511 on the main control board 510 is further configured to determine to use the fourth default flow entry of the virtual network to forward the first data packet when the controller works normally and the forwarding device looks up the third flow table based on the match item of the first data packet but no flow entry is hit.

Based on manner 2, in yet another possible implementation, the central processing unit 511 on the main control board 510 is further configured to set the priority of the third default flow entry of the virtual network to be higher than the priority of the fourth default flow entry of the virtual network after determining that the controller is faulty. The network processor 532 is further configured to send the first data packet to the first flow table according to the instruction of the third default flow entry of the virtual network, and then instruct the physical interface card 533 or 543 to send the first data packet to the specified forwarding device based on the first default flow entry of the virtual network in the first flow table.

It should be understood that, in this embodiment of the present disclosure, an operation on the interface board 540 is consistent with an operation on the interface board 530. For brevity, details are not described again. It should be understood that, the forwarding device 500A in this embodiment may correspond to the forwarding device in the embodiments corresponding to FIG. 1 to FIG. 3B-1, FIG. 3B-2, and FIG. 3B-3 (for example, the forwarding device 1, 2, or 3 in FIG. 1); and the main control board 510, and the interface board 530 and/or 540 in the forwarding device 500A may implement the functions and/or steps implemented by the forwarding device in the embodiments corresponding to FIG. 1 to FIG. 3B-1, FIG. 3B-2, and FIG. 3B-3. For brevity, details are not described again herein.

It should be noted that, there may be one or more main control boards, and when there are a plurality of main control boards, the main control boards may include an active main control board and a standby main control board. There may be one or more interface boards. If a data processing capability of the forwarding device is higher, more interface boards are provided. There may also be one or more physical interface cards on the interface board. There may be no switching board or one or more switching boards. When there are a plurality of switching boards, load sharing and redundancy backup may be implemented. In a centralized forwarding architecture, the forwarding device may not require the switching board, and the interface board undertakes a service data processing function of an entire system. In a distributed forwarding architecture, the forwarding device may have at least one switching board, implement data switching between a plurality of interface boards using the switching board, and provide a large data switching capacity and a high processing capability. Therefore, data access and processing capabilities of the forwarding device in the distributed architecture are higher than those of a device in the centralized architecture. Optionally, a form of the forwarding device 500A may alternatively include only one board. To be more specific, no switching board exists, and functions of the interface board and the main control board are integrated in the board. In this case, the central processing unit on the interface board and the central processing unit on the main control board may be combined into one central processing unit that performs functions of the two combined central processing units on the board. Data switching and processing capabilities of the device in this form are relatively low (for example, a network device such as a low-end switch or router). Which architecture is specifically used depends on a specific networking deployment scenario, and is not limited herein.

Figure 5B:
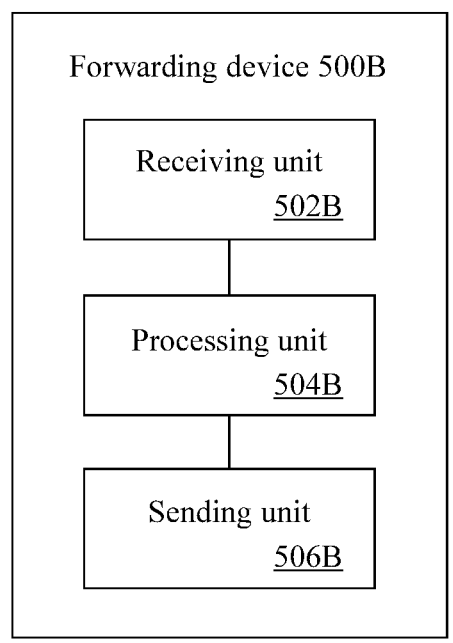
FIG. 5B is a schematic structural diagram of another forwarding device according to an embodiment of the present disclosure.

FIG. 5B is another possible schematic structural diagram of a forwarding device used in the foregoing embodiment. A forwarding device 500B is applied to a virtual network in which control and forwarding are separated. The virtual network includes a controller and the forwarding device 500B. The forwarding device 500B includes a processing unit 504B, a receiving unit 502B, and a sending unit 506B.

The receiving unit 502B is configured to receive a first default flow entry of the virtual network from the controller (for details, refer to the descriptions about the related parts in FIG. 2 to FIG. 3B-1, FIG. 3B-2, and FIG. 3B-3, and details are not described again herein), where the first default flow entry of the virtual network is an entry in a first flow table. The receiving unit 502B is further configured to receive a first data packet from an end system (ES) in the virtual network. The processing unit 504B is configured to determine to use the first default flow entry of the virtual network to forward the first data packet when the controller is faulty and the forwarding device looks up the first flow table based on a match item of the first data packet but no flow entry is hit. The sending unit 506B is configured to send the first data packet to the specified forwarding device. The forwarding device 500B further includes a storage unit, where the storage unit is configured to store the first default flow entry of the virtual network.

Optionally, the forwarding device further receives a second default flow entry of the virtual network from the controller. Depending on whether the second default flow entry of the virtual network and the first default flow entry of the virtual network are stored in a same flow table, there are the following two possible implementations.

Manner 1 is an implementation in which default flow entries are entries in a same flow table.

Based on manner 1, in a possible implementation, the receiving unit 502B is further configured to receive the second default flow entry of the virtual network from the controller (for details, refer to the descriptions about the related parts in FIG. 2 and FIG. 3A-1 and FIG. 3A-2, and details are not described again herein), where the second default flow entry is an entry in the first flow table. A priority of the second default flow entry of the virtual network is higher than a priority of the first default flow entry of the virtual network. The processing unit 504B is further configured to determine to use the second default flow entry of the virtual network to forward the first data packet when the controller works normally and the forwarding device looks up the first flow table based on the match item of the first data packet but no flow entry is hit. The sending unit 506B is further configured to send the first data packet to the controller.

Based on manner 1, in a possible implementation, the processing unit 504B is further configured to set the priority of the first default flow entry of the virtual network to be higher than the priority of the second default flow entry of the virtual network after determining that the controller is faulty.

Based on manner 1, in a possible implementation, the processing unit 504B is further configured to set the priority of the second default flow entry of the virtual network to be higher than the priority of the first default flow entry of the virtual network when determining that the controller recovers from the fault, and instruct the sending unit 506B to send the first data packet based on the second default flow entry of the virtual network when no flow entry is hit.

Based on manner 1, in a possible implementation, the processing unit 504B is further configured to set the priority of the first default flow entry of the virtual network to be higher than the priority of the second default flow entry of the virtual network when determining that the controller works normally, and instruct the sending unit 506B to send the first data packet preferentially based on the first default flow entry of the virtual network when no flow entry is hit.

Based on manner 1, in a possible implementation, the storage unit is further configured to store the second default flow entry of the virtual network.

Manner 2 is an implementation in which default flow entries are entries in different flow tables.

Based on manner 2, in a possible implementation, the receiving unit 502B is further configured to receive the second default flow entry of the virtual network from the controller (for details, refer to the descriptions about the related parts in FIG. 2 and FIG. 3B-1, FIG. 3B-2, and FIG. 3B-3, and details are not described again herein), where the second default flow entry of the virtual network is an entry in a second flow table. The processing unit 504B is further configured to determine to use the second default flow entry of the virtual network to forward the first data packet when the controller works normally and the forwarding device looks up the second flow table based on the match item of the first data packet but no flow entry is hit. The sending unit 506B is further configured to send the first data packet to the controller.

Based on manner 2, in a possible implementation, the receiving unit 502B is further configured to receive a third default flow entry of the virtual network from the controller (for details, refer to the descriptions about the related parts in FIG. 2 and FIG. 3B-1, FIG. 3B-2, and FIG. 3B-3, and details are not described again herein), where the third default flow table of the virtual network is an entry in a third flow table. The processing unit 504B is further configured to determine to use the third default flow entry of the virtual network to forward the first data packet when the controller is faulty and the forwarding device looks up the third flow table based on the match item of the first data packet but no flow entry is hit. The sending unit 506B is further configured to send the first data packet to the first flow table.

Based on manner 2, in a possible implementation, the receiving unit 502B is further configured to receive a fourth default flow entry of the virtual network from the controller (for details, refer to the descriptions about the related parts in FIG. 2 and FIG. 3B-1, FIG. 3B-2, and FIG. 3B-3, and details are not described again herein), where the fourth default flow entry of the virtual network is an entry in the third flow table. A priority of the fourth default flow entry of the virtual network is higher than a priority of the third default flow entry of the virtual network. The processing unit 504B is further configured to determine to use the fourth default flow entry of the virtual network to forward the first data packet when the controller works normally and the forwarding device looks up the third flow table based on the match item of the first data packet but no flow entry is hit. The sending unit 506B is further configured to send the first data packet to the second flow table.

Based on manner 2, in a possible implementation, the processing unit 504B is further configured to set the priority of the third default flow entry of the virtual network to be higher than the priority of the fourth default flow entry of the virtual network after determining that the controller is faulty.

Based on manner 2, in a possible implementation, the processing unit 504B is further configured to set the priority of the fourth default flow entry of the virtual network to be higher than the priority of the third default flow entry of the virtual network when determining that the controller recovers from the fault, and instruct the sending unit 506B to send the first data packet based on the fourth default flow entry of the virtual network when no flow entry is hit.

Based on manner 2, in a possible implementation, the processing unit 504B is further configured to set the priority of the third default flow entry of the virtual network to be higher than the priority of the fourth default flow entry of the virtual network when determining that the controller works normally, and instruct the sending unit 506B to send the first data packet based on the third default flow entry of the virtual network when no flow entry is hit.

Based on manner 2, in a possible implementation, the storage unit is further configured to store the second, third, and fourth default flow entries of the virtual network.

The forwarding device 500B in this embodiment of the present disclosure may correspond to the forwarding device in the embodiment of the foregoing data packet forwarding method. In addition, each module and the foregoing other operations and/or functions in the forwarding device 500B are respectively intended for implementing each step and method implemented by the forwarding device in the embodiments corresponding to FIG. 1 to FIG. 4. For brevity, details are not described again herein.

Figure 5C:
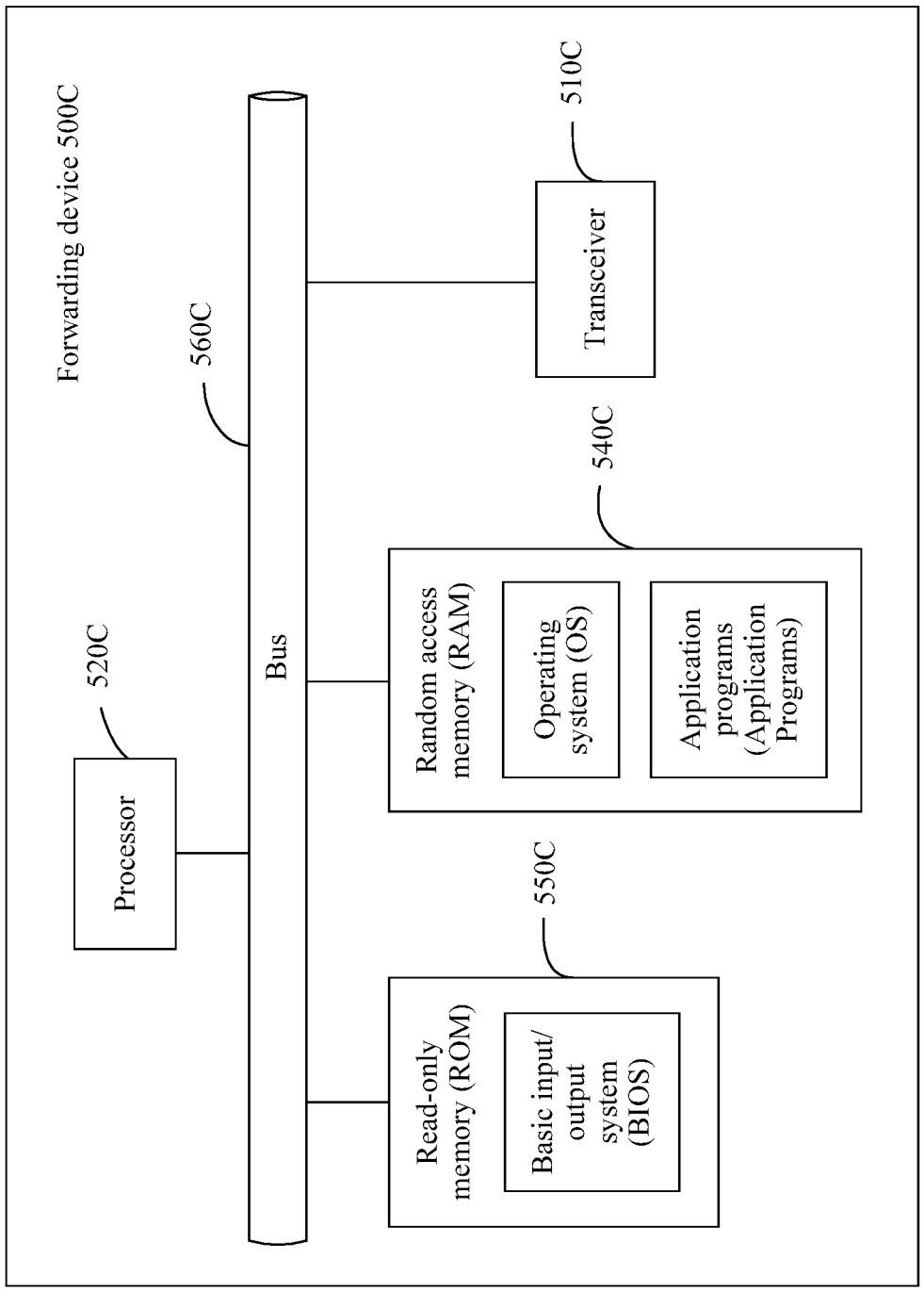
FIG. 5C is a schematic structural diagram of still another forwarding device according to an embodiment of the present disclosure.

FIG. 5C is still another possible schematic structural diagram of a forwarding device used in the foregoing embodiment. A forwarding device 500C includes a transceiver 510C, a processor 520C, a random access memory 540C, a read-only memory 550C, and a bus 560C. The processor 520C is coupled to the transceiver 510C, the random access memory 540C, and the read-only memory 550C respectively using the bus 560C. When the forwarding device 500C needs to run, a basic input/output system cured in the read-only memory 550C or a bootloader system in an embedded system is used for startup, such that the forwarding device 500C enters a normal running state. After the forwarding device 500C enters the normal running state, an application program and an operating system run in the random access memory 540C to perform the following operations.

The transceiver 510C is configured to receive a first default flow entry of a virtual network from the controller, where the first default flow entry of the virtual network instructs the forwarding device to send a data packet in the virtual network to a specified forwarding device when the forwarding device looks up a first flow table based on a match item of the data packet in the virtual network but no flow entry is hit. The transceiver 510C is further configured to receive a first data packet from an end system (ES) in the virtual network. The processor 520C is configured to determine to use the first default flow entry of the virtual network to forward the first data packet when the controller is faulty and the forwarding device looks up the first flow table based on a match item of the first data packet but no flow entry is hit. The transceiver 510C is further configured to send the first data packet to the specified forwarding device. The random access memory 540C is further configured to store the first default flow entry of the virtual network.

The forwarding device 500C in this embodiment of the present disclosure may correspond to the forwarding device in the embodiments corresponding to FIG. 1 to FIG. 4. In addition, the processor 520C, the transceiver 510C, and the like in the forwarding device 500C may implement the functions and/or steps and methods implemented by the forwarding device in the embodiments corresponding to FIG. 1 to FIG. 4. The processor 520C is configured to perform all operations of the processing unit 504B of the forwarding device in FIG. 5B, and the transceiver 510C is configured to perform all operations of the receiving unit 502B and the sending unit 506B of the forwarding device in FIG. 5B. For brevity, details are not described again herein.

It should be noted that, the forwarding device in this embodiment may also be implemented based on a universal physical server in combination with a network function virtualization (NFV) technology, and the forwarding device is a virtual forwarding device (such as a virtual router or a virtual switch). The virtual forwarding device may be a virtual machine (VM) that runs a program used for forwarding data packets, where the virtual machine is deployed on a hardware device (for example, a physical server). The virtual machine is a complete computer system simulated by software, having complete hardware system functions, and running in a completely isolated environment. By reading this application and referring to the NFV technology, a person skilled in the art may virtualize a plurality of forwarding devices having the foregoing functions on a universal physical server. Details are not described again herein.

Figure 6A:
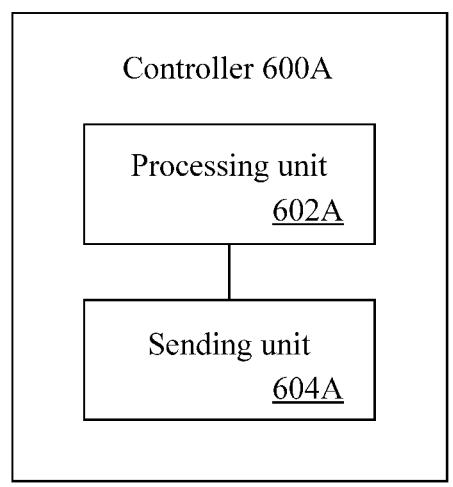
FIG. 6A is a schematic structural diagram of a controller according to an embodiment of the present disclosure.

FIG. 6A is a possible schematic structural diagram of a controller 600A used in the foregoing embodiment. The controller 600A is applied to a virtual network in which control and forwarding are separated. The virtual network includes the controller 600A and a forwarding device. The controller 600A includes a processing unit 602A and a sending unit 604A.

The processing unit 602A is configured to generate a first default flow entry of the virtual network, where the first default flow entry of the virtual network instructs the forwarding device to send a data packet in the virtual network to a specified forwarding device when the controller 600A is faulty and the forwarding device looks up a flow table based on a match item of the data packet in the virtual network but no flow entry is hit, or instructs the forwarding device to send a data packet in the virtual network to the specified forwarding device when the controller 600A works normally and the forwarding device looks up a flow table based on a match item of the data packet in the virtual network but no flow entry is hit. The processing unit 602A is further configured to generate a second default flow entry of the virtual network, where the second default flow entry of the virtual network instructs the forwarding device to send a data packet in the virtual network to the controller 600A when the controller 600A works normally and the forwarding device looks up the flow table based on a match item of the data packet in the virtual network but no flow entry is hit. The sending unit 604A is configured to send the first default flow entry of the virtual network and the second default flow entry of the virtual network to the forwarding device.

Optionally, depending on whether the second default flow entry of the virtual network and the first default flow entry of the virtual network are stored in a same flow table, there are the following two possible implementations.

Manner 1 is an implementation in which default flow entries are entries in a same flow table.

Based on manner 1, in a possible implementation, the first default flow entry of the virtual network is an entry in a first flow table, and instructing the forwarding device when the controller 600A is faulty and the forwarding device looks up the flow table based on a match item of the data packet in the virtual network but no flow entry is hit includes looking up the first flow table but no flow entry is hit. The second default flow entry of the virtual network is an entry in the first flow table, and instructing the forwarding device when the controller 600A works normally and the forwarding device looks up the flow table based on a match item of the data packet in the virtual network but no flow entry is hit includes looking up the first flow table but no flow entry is hit.

Manner 2 is an implementation in which default flow entries are entries in different flow tables.

Based on manner 2, in a possible implementation, the first default flow entry of the virtual network is an entry in a first flow table, and instructing the forwarding device when the controller 600A is faulty and the forwarding device looks up the flow table based on a match item of the data packet in the virtual network but no flow entry is hit includes looking up the first flow table but no flow entry is hit. The second default flow entry of the virtual network is an entry in a second flow table, and instructing the forwarding device when the controller 600A works normally and the forwarding device looks up the flow table based on a match item of the data packet in the virtual network but no flow entry is hit includes looking up the second flow table but no flow entry is hit.

Based on manner 2, in another possible implementation, the processing unit 602A is further configured to generate a third default flow entry of the virtual network (for details, refer to the descriptions about the related parts in FIG. 2 and FIG. 3B-1, FIG. 3B-2, and FIG. 3B-3, and details are not described again herein). The sending unit 604A is further configured to send the third default flow entry of the virtual network to the forwarding device.

Based on manner 2, in still another possible implementation, the processing unit 602A is further configured to generate a fourth default flow entry of the virtual network (for details, refer to the descriptions about the related parts in FIG. 2 and FIG. 3B-1, FIG. 3B-2, and FIG. 3B-3, and details are not described again herein). The sending unit 604A is further configured to send the fourth default flow entry of the virtual network to the forwarding device.

The controller 600A in this embodiment of the present disclosure may implement the functions and steps implemented by the forwarding device in the foregoing embodiments corresponding to FIG. 1 to FIG. 4. For brevity, details are not described again herein.

Figure 6B:
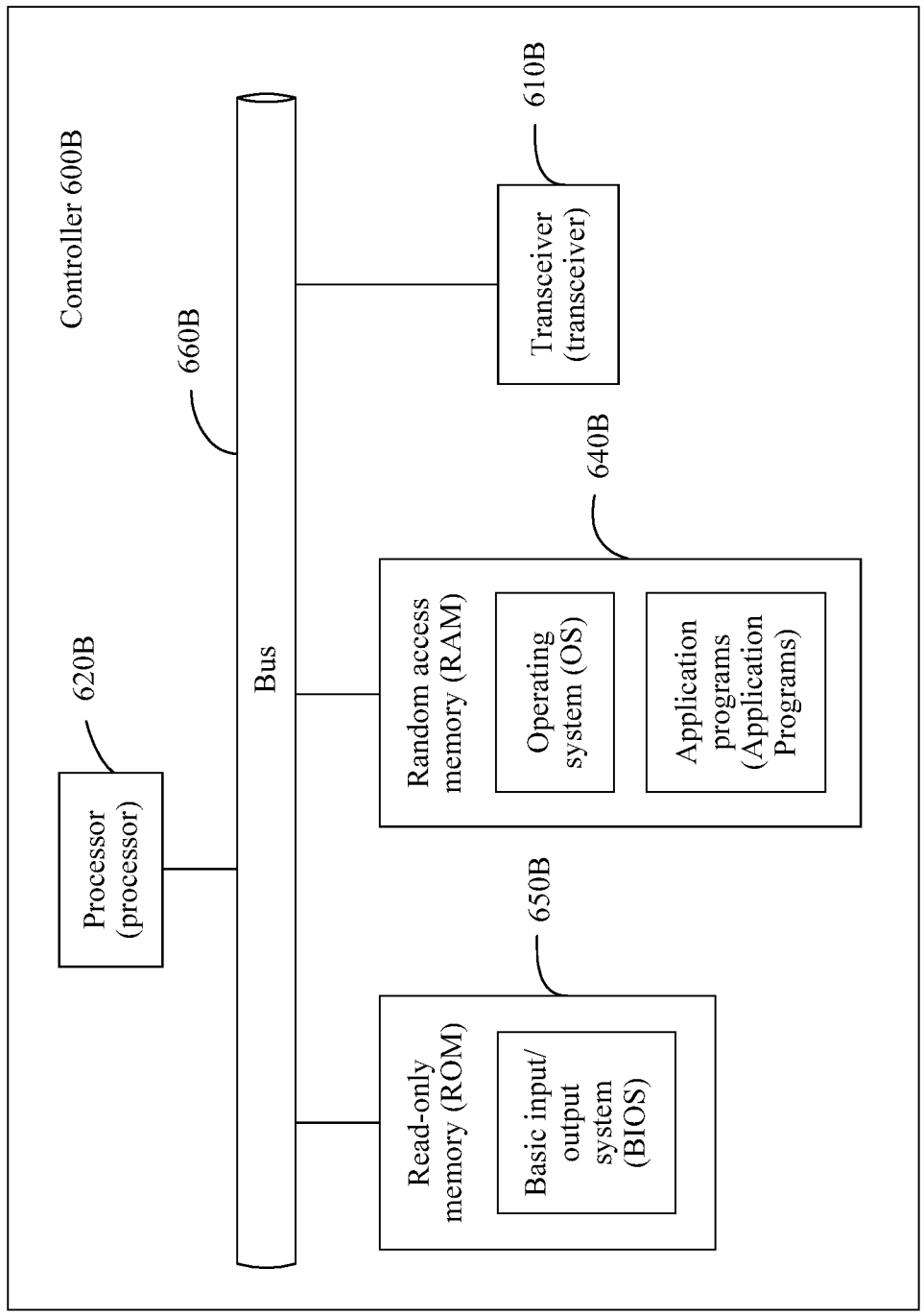
FIG. 6B is a schematic structural diagram of another controller according to an embodiment of the present disclosure.

FIG. 6B is another possible schematic structural diagram of a controller 600B used in the foregoing embodiment. The controller 600B includes a transceiver 610B, a processor 620B, a random access memory 640B, a read-only memory 650B, and a bus 660B. The processor 620B is coupled to the transceiver 610B, the random access memory 640B, and the read-only memory 650B respectively using the bus 660B. When the controller 600B needs to run, a basic input/output system cured in the read-only memory 650B or a bootloader system in an embedded system is used for startup, such that the controller 600B enters a normal running state. After the controller 600B enters the normal running state, an application program and an operating system run in the random access memory 640B to perform the following operations.

The processor 620B is configured to generate a first default flow entry of the virtual network, where the first default flow entry of the virtual network instructs the forwarding device to send a data packet in the virtual network to a specified forwarding device when the controller 600B is faulty and the forwarding device looks up a flow table based on a match item of the data packet in the virtual network but no flow entry is hit, or instructs the forwarding device to send a data packet in the virtual network to the specified forwarding device when the controller 600B works normally and the forwarding device looks up a flow table based on a match item of the data packet in the virtual network but no flow entry is hit. The processor 620B is further configured to generate a second default flow entry of the virtual network, where the second default flow entry of the virtual network instructs the forwarding device to send a data packet in the virtual network to the controller 600B when the controller 600B works normally and the forwarding device looks up the flow table based on a match item of the data packet in the virtual network but no flow entry is hit. The transceiver 610B is configured to send the first default flow entry of the virtual network and the second default flow entry of the virtual network to the forwarding device.

The controller 600B in this embodiment of the present disclosure may correspond to the controller in the embodiments corresponding to FIG. 1 to FIG. 4. In addition, the processor 620B, the transceiver 610B, and the like in the controller 600B may implement the functions and/or steps and methods implemented by the controller in the embodiments corresponding to FIG. 1 to FIG. 4. The processor 620B is configured to perform all operations of the processing unit 602A of the controller in FIG. 6A, and the transceiver 610B is configured to perform all operations of the sending unit 604A in FIG. 6A. For brevity, details are not described again herein.

It should be noted that, the controller in this embodiment may also be implemented based on a universal physical server in combination with an NFV technology, and the controller is a virtual controller. The virtual controller may be a virtual machine (VM) that runs a program having a function for sending a flow entry, where the virtual machine is deployed on a hardware device (for example, a physical server). The virtual machine is a complete computer system simulated by software, having complete hardware system functions, and running in a completely isolated environment. By reading this application and referring to the NFV technology, a person skilled in the art may virtualize a plurality of controllers having the foregoing functions on a universal physical server. Details are not described again herein.

Figure 7:
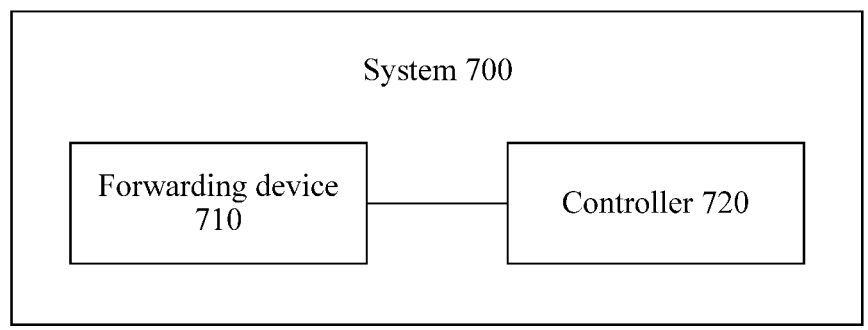
FIG. 7 is a schematic diagram of a network system according to an embodiment of the present disclosure.

FIG. 7 is a schematic diagram of a data packet forwarding system according to an embodiment of the present disclosure. As shown in FIG. 7, a system 700 includes a forwarding device 710 and a controller 720. The forwarding device 710 is any forwarding device or virtual forwarding device in FIG. 5A, FIG. 5B, or FIG. 5C, and the controller 720 is any controller or virtual controller in FIG. 6A or FIG. 6B. For detailed descriptions about each device in the system, refer to the foregoing related chapters in FIG. 5A to FIG. 5C, and FIG. 6A and FIG. 6B. Details are not described again herein.

It should be understood that, on a basis of reading this application document, a person skilled in the art may combine optional features, steps, or methods described in the embodiments of this application without creative efforts, and all such combinations shall fall within the embodiments disclosed by this application. For brevity of description or writing, different combinations are not repeated.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data packet forwarding method applied to a virtual network in which control and forwarding are separated, wherein the virtual network comprises a controller and a forwarding device, and wherein the method comprises:
   receiving, by the forwarding device, a first default flow entry of the virtual network from the controller, wherein the first default flow entry of the virtual network instructs the forwarding device to send a data packet in the virtual network to a specified forwarding device when the forwarding device looks up a first flow table based on a match item of the data packet but no flow entry is hit;
   receiving, by the forwarding device, a second default flow entry of the virtual network from the controller, wherein the second default flow entry of the virtual network instructs the forwarding device to send a second data packet in the virtual network to the controller when the forwarding device looks up the first flow table based on a second match item of the second data packet in the virtual network but no flow entry is hit, and wherein a second priority of the second default flow entry of the virtual network is higher than a first priority of the first default flow entry of the virtual network;
   receiving, by the forwarding device, a first data packet from an end system (ES) in the virtual network; and either
   sending, by the forwarding device when the controller is faulty and the forwarding device looks up the first flow table based on a first match item of the first data packet but no flow entry is hit, the first data packet to the specified forwarding device using the first default flow entry of the virtual network; or
   sending, by the forwarding device when the controller works normally and the forwarding device looks up the first flow table based on the first match item of the first data packet but no flow entry is hit, the first data packet to the controller using the second default flow entry of the virtual network.

2. The method according to claim 1, further comprising setting, by the forwarding device when determining that the controller is faulty, the first priority of the first default flow entry of the virtual network to be higher than the second priority of the second default flow entry of the virtual network, such that the first default flow entry of the virtual network is preferentially used to send the first data packet to the specified forwarding device when no flow entry is hit.

3. The method according to claim 1, further comprising setting, by the forwarding device when determining that the controller works normally, the first priority of the first default flow entry to be higher than the second priority of the second default flow entry such that the first default flow entry of the virtual network is preferentially used to send the first data packet to the specified forwarding device when no flow entry is hit.

4. The method according to claim 1, further comprising setting, by the forwarding device when determining that the controller recovers from being faulty, the second priority of the second default flow entry of to be higher than the first priority of the first default flow entry such that the second default flow entry of the virtual network is preferentially used to send the first data packet to the controller when no flow entry is hit.

5. The method according to claim 1, further comprising:
   receiving, by the forwarding device, the second default flow entry of the virtual network from the controller, wherein the second default flow entry of the virtual network instructs the forwarding device to send the second data packet in the virtual network to the controller when the forwarding device looks up a second flow table based on the second match item of the second data packet but no flow entry is hit; and
   sending, by the forwarding device when the controller works normally and the forwarding device looks up the second flow table based on the first match item of the first data packet but no flow entry is hit, the first data packet to the controller using the second default flow entry of the virtual network.

6. The method according to claim 5, further comprising:
   receiving, by the forwarding device, a third default flow entry of the virtual network from the controller, wherein the third default flow entry of the virtual network instructs the forwarding device to send a third data packet in the virtual network based on the first flow table when the forwarding device looks up a third flow table based on a third match item of the data packet in the virtual network but no flow entry is hit; and
   sending, by the forwarding device when the controller is faulty and the forwarding device looks up the third flow table based on the first match item of the first data packet but no flow entry is hit, the first data packet based on the first flow table according to the third default flow entry of the virtual network.

7. The method according to claim 6, further comprising:
   receiving, by the forwarding device, a fourth default flow entry of the virtual network from the controller, wherein the fourth default flow entry of the virtual network instructs the forwarding device to send a fourth data packet in the virtual network based on the second flow table when the forwarding device looks up the third flow table based on a fourth match item of the data packet in the virtual network but no flow entry is hit, and wherein a fourth priority of the fourth default flow entry of the virtual network is higher than a third priority of the third default flow entry of the virtual network; and
   sending, by the forwarding device when the controller works normally and the forwarding device looks up the third flow table based on the first match item of the first data packet but no flow entry is hit, the first data packet based on the second flow table according to the fourth default flow entry of the virtual network.

8. The method according to claim 7, further comprising setting, by the forwarding device when determining that the controller is faulty, the third priority of the third default flow entry of the virtual network to be higher than the fourth priority of the fourth default flow entry of the virtual network, such that the first data packet is sent preferentially based on the first flow table according to the third default flow entry of the virtual network when no flow entry is hit.

9. A flow entry sending method applied to a virtual network in which control and forwarding are separated, wherein the virtual network comprises a controller and a forwarding device, and wherein the method comprises:
generating, by the controller, a first default flow entry of the virtual network, wherein the first default flow entry of the virtual network instructs the forwarding device to send a data packet in the virtual network to a specified forwarding device either when the controller is faulty and the forwarding device looks up a flow table based on a match item of the data packet in the virtual network but no flow entry is hit, or when the controller works normally and the forwarding device looks up the flow table based on the match item of the data packet in the virtual network but no flow entry is hit;
generating, by the controller, a second default flow entry of the virtual network, wherein the second default flow entry of the virtual network instructs the forwarding device to send a second data packet in the virtual network to the controller when the controller works normally and the forwarding device looks up the flow table based on a second match item of the second data packet in the virtual network but no flow entry is hit; and
sending, by the controller, the first default flow entry of the virtual network and the second default flow entry of the virtual network to the forwarding device.

10. The method according to claim 9, wherein the first default flow entry of the virtual network is an entry in a first flow table, wherein the second default flow entry of the virtual network is a second entry in the first flow table, and wherein the flow table is the first flow table.

11. The method according to claim 9, wherein the first default flow entry of the virtual network is an entry in a first flow table, wherein the first flow table instructs the forwarding device to send the data packet when the controller is faulty and the forwarding device looks up the flow table based on the match item of the data packet in the virtual network but no flow entry is hit, wherein the second default flow entry of the virtual network is a second entry in a second flow table, and wherein the second flow table instructs the forwarding device to send the second data packet when the controller works normally and the forwarding device looks up the second flow table based on the second match item of the second data packet in the virtual network but no flow entry is hit.

12. The method according to claim 11, further comprising:
generating, by the controller, a third default flow entry of the virtual network, wherein the third default flow entry of the virtual network instructs the forwarding device to send a third data packet in the virtual network based on the first flow table when the controller is faulty and the forwarding device looks up a third flow table based on a third match item of the third data packet in the virtual network but no flow entry is hit; and
sending, by the controller, the third default flow entry of the virtual network to the forwarding device.

13. A forwarding device applied to a virtual network in which control and forwarding are separated, wherein the virtual network comprises a controller and the forwarding device, and wherein the forwarding device comprises:
at least one processor; and
a computer-readable storage medium storing instructions to be executed by the at least one processor to cause the forwarding device to:
receive a first default flow entry of the virtual network from the controller, wherein the first default flow entry of the virtual network instructs the forwarding device to send a data packet in the virtual network to a specified forwarding device when the forwarding device looks up a first flow table based on a match item of the data packet in the virtual network but no flow entry is hit;
receive a second default flow entry of the virtual network from the controller, wherein the second default flow entry of the virtual network instructs the forwarding device to send a second data packet in the virtual network to the controller when the forwarding device looks up the first flow table based on a second match item of the data packet in the virtual network but no flow entry is hit, and wherein a second priority of the second default flow entry of the virtual network is higher than a first priority of the first default flow entry of the virtual network;
receive a first data packet from an end system (ES) in the virtual network;
determine to use the first default flow entry of the virtual network to forward the first data packet when the controller is faulty and the forwarding device looks up the first flow table based on a first match item of the first data packet but no flow entry is hit; and either
send the first data packet to the specified forwarding device; or
send the first data packet to the controller after determining to use the second default flow entry of the virtual network to forward the first data packet when the controller works normally and the forwarding device looks up the first flow table based on the first match item of the first data packet but no flow entry is hit.

14. The forwarding device according to claim 13, wherein the instructions, when executed by the at least one processor, further cause the forwarding device to set the first priority of the first default flow entry to be higher than the second priority of the second default flow entry when determining that the controller is faulty.

15. The forwarding device according to claim 13, wherein the instructions, when executed by the at least one processor, further cause the forwarding device to:
set the first priority of the first default flow entry to be higher than the second priority of the second default flow entry when determining that the controller works normally; and
send the first data packet preferentially based on the first default flow entry of the virtual network when no flow entry is hit.

16. The forwarding device according to claim 13, wherein the instructions, when executed by the at least one processor, further cause the forwarding device to:
set the second priority of the second default flow entry to be higher than the first priority of the first default flow entry when determining that the controller recovers from being faulty; and
send the first data packet based on the second default flow entry of the virtual network when no flow entry is hit.

17. The forwarding device according to claim 13, wherein the instructions, when executed by the at least one processor, further cause the forwarding device to:

receive a second default flow entry of the virtual network from the controller, wherein the second default flow entry of the virtual network instructs the forwarding device to send a third data packet in the virtual network to the controller when the forwarding device looks up a second flow table based on a third match item of the third data packet in the virtual network but no flow entry is hit;

determine to use the second default flow entry of the virtual network to forward the first data packet when the controller works normally and the forwarding device looks up the second flow table based on the first match item of the first data packet but no flow entry is hit; and send the first data packet to the controller.

18. The forwarding device according to claim 17, wherein the instructions, when executed by the at least one processor, further cause the forwarding device to:

receive a third default flow entry of the virtual network from the controller, wherein the third default flow entry of the virtual network instructs the forwarding device to send a fourth data packet in the virtual network based on the first flow table when the forwarding device looks up a third flow table based on a fourth match item of the fourth data packet in the virtual network but no flow entry is hit;

determine to use the first flow table as a basis for forwarding the first data packet according to the third default flow entry of the virtual network when the controller is faulty and the forwarding device looks up the third flow table based on the first match item of the first data packet but no flow entry is hit; and send the first data packet based on a determining result.

19. The forwarding device according to claim 18, wherein the instructions, when executed by the at least one processor, further cause the forwarding device to:

receive a fourth default flow entry of the virtual network from the controller, wherein the fourth default flow entry of the virtual network instructs the forwarding device to send a fifth data packet in the virtual network based on the second flow table when the forwarding device looks up the third flow table based on a fifth match item of the fifth data packet in the virtual network but no flow entry is hit, and wherein a fourth priority of the fourth default flow entry of the virtual network is higher than a third priority of the third default flow entry of the virtual network;

determine to use the second flow table as a second basis for forwarding the first data packet according to the fourth default flow entry of the virtual network when the controller works normally and the forwarding device looks up the third flow table based on the first match item of the first data packet but no flow entry is hit; and send the first data packet based on determining to use the second flow table.

20. A controller applied to a virtual network in which control and forwarding are separated, wherein the virtual network comprises the controller and a forwarding device, and wherein the controller comprises:

at least one processor; and a computer-readable storage medium storing instructions to be executed by the at least one processor to cause the controller to:

generate a first default flow entry of the virtual network, wherein the first default flow entry of the virtual network instructs the forwarding device to send a data packet in the virtual network to a specified forwarding device either when the controller is faulty and the forwarding device looks up a flow table based on a match item of the data packet in the virtual network but no flow entry is hit, or when the controller works normally and the forwarding device looks up the flow table based on the match item of the data packet in the virtual network but no flow entry is hit;

generate a second default flow entry of the virtual network, wherein the second default flow entry of the virtual network instructs the forwarding device to send a second data packet in the virtual network to the controller when the controller works normally and the forwarding device looks up the flow table based on a second match item of the second data packet in the virtual network but no flow entry is hit; and send the first default flow entry of the virtual network and the second default flow entry of the virtual network to the forwarding device.

21. The controller according to claim 20, wherein the first default flow entry of the virtual network is an entry in a first flow table, wherein the second default flow entry of the virtual network is a second entry in the first flow table, and wherein the flow table is the first flow table.

* * * * *